United States Patent [19]

Phillips et al.

[11] Patent Number: 4,604,562
[45] Date of Patent: Aug. 5, 1986

[54] FEEDBACK-CONTROLLED WORKPIECE POSITIONING SYSTEM

[75] Inventors: Edward H. Phillips, Middletown; Lawrence A. Wise, Sunnyvale, both of Calif.

[73] Assignee: Eaton-Optimetrix Inc., San Jose, Calif.

[21] Appl. No.: 427,716

[22] Filed: Sep. 29, 1982

[51] Int. Cl.⁴ .............................................. G05B 1/06
[52] U.S. Cl. .................................... 318/640; 364/582; 250/548 250/201; 318/480; 318/577
[58] Field of Search ............... 318/577, 640, 603, 592, 318/480, 594, 601, 620, 605, 608, 721, 661, 575; 356/147, 399-401, 435; 364/169, 573, 582; 250/201, 204, 553

[56] References Cited

U.S. PATENT DOCUMENTS

| 3,718,821 | 2/1973 | Vischulis | 318/577 X |
|---|---|---|---|
| 3,798,524 | 3/1974 | Okamoto | 318/603 X |
| 3,886,562 | 5/1975 | Atzinger | 318/640 X |
| 3,909,688 | 9/1975 | Blaschke | 318/721 X |
| 4,123,695 | 10/1978 | Hale | 318/640 X |
| 4,160,200 | 7/1979 | Imamura | 318/640 X |
| 4,203,064 | 5/1980 | Suziki | 318/640 |
| 4,425,537 | 1/1981 | Phillips | 318/577 X |
| 4,429,267 | 1/1984 | Veale | 318/603 X |
| 4,442,388 | 4/1984 | Phillips | 318/640 |
| 4,458,145 | 7/1984 | Voles | 250/201 X |
| 4,496,832 | 1/1985 | Sakai | 250/201 |

Primary Examiner—Bernard Roskoski
Assistant Examiner—Patrick C. Keane
Attorney, Agent, or Firm—Roland I. Griffin

[57] ABSTRACT

X-Y position measurement apparatus is employed with feedback controlled X-Y positioning apparatus for positioning a workpiece stage at a desired X-Y coordinate position in response to signals indicative of the actual position and the desired position of the workpiece stage. A normalization circuit is employed for gain correction of the signals indicative of the actual position of the workpiece stage.

30 Claims, 26 Drawing Figures

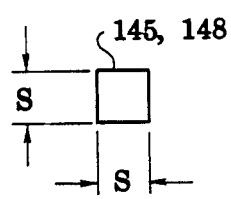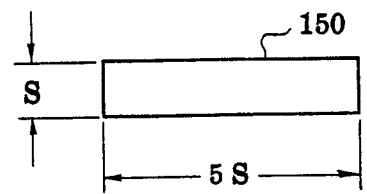
Figure 10
Figure 12
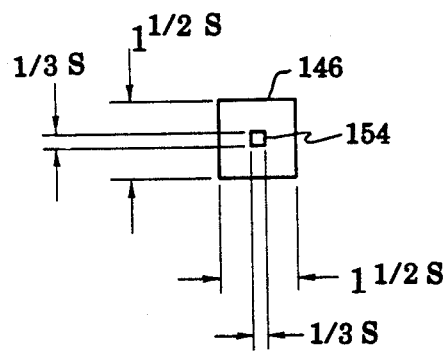
Figure 11

FEEDBACK-CONTROLLED WORKPIECE POSITIONING SYSTEM

BACKGROUND OF THE INVENTION

This invention relates broadly to workpiece positioning systems, and more specifically to high-precision, X-Y position measurement apparatus employed with feedback-controlled positioning apparatus in step-and-repeat mask aligners for fabricating semiconductor integrated circuits.

Integrated circuit fabrication involves successively forming a series of microcircuit patterns upon a semiconductor substrate. Machines known as mask aligners are used to transfer each microcircuit pattern from a mask or a reticle to a photoresist-coated surface of the substrate. Subsequent processing of the substrate involving etching, deposition, ion implantation, or other similar techniques forms each transferred microcircuit pattern on the substrate. Each of the series of microcircuit patterns formed on the substrate must be accurately aligned with respect to all other previously-formed microcircuit patterns to insure a functional integrated circuit.

One type of mask aligner known as a step-and-repeat projection mask aligner, or stepper, is commonly used in the semiconductor industry today. Such a stepper optically projects an image of a mask or a reticle, incorporating a microcircuit pattern for a single die or a small number of dice, onto a portion of a photoresist-coated surface of the substrate. The microcircuit pattern is photolithographically printed on that surface portion of the substrate by exposing that surface portion to ultraviolet light passing through the mask or the reticle. The substrate is thereupon successively stepped to different positions so that the same microcircuit pattern may be repeatedly photolithographically printed on adjacent surface portions of the substrate in the same manner across the entire photoresist-coated surface of the substrate. Images of the mask or the reticle may be projected by employing a 1:1 projection lens or by employing a reduction, such as a 5:1 or a 10:1, projection lens.

There are certain advantages, and disadvantages as well, to the utilization of step-and-repeat mask aligners, or steppers, as opposed to other types of mask aligners, such as contact-printing and proximity mask aligners. One advantage is that steppers can use masks or reticles for exposing only a fraction of the total photoresist-coated surface of the substrate at one time, whereas contact-printing and proximity mask aligners must use masks for exposing the entire photoresist-coated surface of the substrate at once. Thus, the masks or reticles used by steppers are easier to produce than the masks used by contact-printing and proximity mask aligners. Another advantage of reduction type steppers is that they may be less sensitive to particulate contamination of the mask or reticle than 1:1 steppers or other mask aligners. However, one disadvantage of all steppers is the time required for the multiple exposures necessary to completely expose the photoresist-coated surface of the substrate.

In order to compete with the production throughput of contact-printing and proximity mask aligners, steppers require rapid and accurate repositioning of the substrate between exposures. This is typically accomplished by employing position measurement apparatus with feedback-controlled servomotor positioning apparatus to drive a moveable stage, upon which the substrate is supported, from one exposure position to another along orthogonal X and Y axes. Accurate position measurement apparatus must be utilized to achieve the sub-micrometer positioning accuracy necessary for microcircuit pattern alignment and to facilitate precision stepping between exposure positions. Such precision stepping can increase production throughput by eliminating the need for time consuming substrate-to-mask or reticle alignment operations between exposures.

In the past the position measurement apparatus has often included a laser interferometer utilizing the wavelength of a laser beam to measure or determine stage and, hence, substrate position. Inaccuracies are inherent in this technique, however, since the wavelength of a laser beam is a function of temperature and barometric pressure. To achieve sufficiently accurate position feedback, the laser beam must be housed in an environmentally-controlled chamber, which adds substantially to the complexity and cost of a stepper so equipped.

Thus, an improved positioning system is needed for accurately and rapidly positioning a semiconductor substrate, or more generally any workpiece, at a sequence of predetermined positions. In addition, an improved workpiece positioning system is needed that is capable of retaining sufficient positioning accuracy throughout a range of environmental conditions typically experienced by workpiece positioning systems.

Workpiece positioning systems of a type generally similar to the present invention are described in U.S. Pat. No. 4,425,537 entitled X-Y ADDRESSABLE WORKPIECE POSITIONER AND MASK ALIGNER USING SAME and filed on Oct. 20, 1980 by Edward H. Phillips and Karl-Heinz Johannsmeier (a continuation of U.S. patent application Ser. No. 918,713 filed on June 26, 1978, and now abandoned) and in U.S. Pat. No. 4,442,388 entitled X-Y ADDRESSABLE WORKPIECE POSITIONER HAVING AN IMPROVED ADDRESS INDICIA SENSOR and filed on July 27, 1981, by Edward H. Phillips (a continuation of U.S. patent application Ser. No. 136,816 filed on Apr. 2, 1980, which is in turn a continuation of U.S. patent application Ser. No. 925,454 filed on July 17, 1978). U.S. Pat. Nos. 4,425,537 and 4,442,388 are assigned to the same assignee as the present application and are herein incorporated by reference. The workpiece positioning systems described in these patent applications constitute the closest prior art known to applicants and comprise the following elements: a workpiece stage moveable along coordinate X and Y axes; an X-Y array of coordinate indicia attached to the workpiece stage; a light source for illuminating the coordinate indicia; a sensor stage moveable along the coordinate X and Y axes; an opaque masking plate mounted on the sensor stage and provided with transparent windows; a lens system for projecting a focused image of the coordinate indicia onto the masking plate; an array of photodiodes mounted on the sensor stage and responsive to light reflected from the coordinate indicia and transmitted through the windows of the masking plate; a first pair of servomotors and first control apparatus for controlling the position of the workpiece stage; and a second pair of servomotors and second control apparatus for controlling the position of the sensor stage.

To position a workpiece at a desired position, the first pair of servomotors and the first control apparatus move the workpiece stage and, hence, the workpiece to a position at which the positional error from the desired position is no greater than the indicium spacing. The first and second control apparatus then couple, or lock, the workpiece stage to the sensor stage for movement therewith. This permits the sensor stage to be moved to an interpolated position so as to concomitantly move the workpiece stage to the desired position. Linear variable differential transformer displacement transducers are utilized for providing sensor stage position feedback.

While the above-described workpiece positioning systems are fully functional, they are limited in workpiece positioning accuracy by the accuracy of the linear, variable differential transformer displacement transducers. Additionally, the fabrication of these workpiece positioning systems is quite complex due to the alignment requirements of the sensor stage relative to the workpiece stage and due to the motion and control requirements of the sensor stage. Thus, a more accurate and less complex workpiece positioning system is needed.

SUMMARY OF THE INVENTION

It is an object of this invention to provide an improved workpiece positioning system capable of rapidly and precisely positioning a workpiece at a predetermined X-Y coordinate location.

Another object of this invention is to provide an improved workpiece positioning system and method for use in a step-and-repeat projection mask aligner employed in the fabrication of integrated circuits.

Another object of this invention is to provide a workpiece positioning system having improved position measurement and feedback control apparatus that does not require specially controlled environmental conditions to retain measurement accuracy.

A further object of this invention is to provide a less complex and more accurate workpiece positioning system of the type described in U.S. Pat. Nos. 4,425,537 and 4,442,388 by eliminating the need for a moveable sensor stage and the associated servomotors and control apparatus in such a system.

Still a further object of this invention is to provide position measurement and feedback control apparatus for providing position measurement signals having accuracies that are insensitive to nonlinearities and biases typical of commercially available photodiodes and other electronic devices employed in such apparatus.

These and other objects, which will become apparent hereinafter, are accomplished in accordance with the illustrated preferred embodiment of the present invention by employing X-Y position measurement apparatus with feedback-controlled X-Y positioning apparatus to position an air-bearing supported stage at a desired or predetermined position so that a microcircuit pattern may be transferred from a reticle to a portion of a photoresist-coated surface of a substrate supported on the stage. The feedback-controlled X-Y positioning apparatus includes the stage and a pair of servomotors for moving the stage in an X-Y coordinate plane. This apparatus also includes a servomotor controller, responsive to a positional error computed from a measured stage position and the desired or predetermined stage position, for directing the servomotors to move the stage to the desired or predetermined stage position.

The X-Y position measurement apparatus includes a uniformly spaced, two-dimensional, array of X-Y coordinate indicia coupled to the stage for movement therewith. This indicia array is composed of a grid of identical reflective squares on a relatively nonreflective background with a center-to-center indicium spacing between adjacent squares equal to twice the length of a side of a square. Measurement signals indicative of stage position and, hence, of the corresponding substrate position are produced by photoelectrically sensing a magnified and focused image of the indicia array as projected through a stationary masking plate having transparent windows equal in width to one-half of the indicium spacing as projected. These measurement signals are gain corrected by a normalization circuit to reduce the effects of nonlinearities inherent in the X-Y position measurement apparatus and are processed by a measurement circuit to provide counting signals and position feedback signals indicative of the stage position. The counting signals are utilized to compute positional errors greater than the indicium spacing while the feedback signals are utilized to compute positional errors less than the indicium spacing.

DESCRIPTION OF THE DRAWINGS

FIGS. 10, 11 and 12 are dimensioned plan views of a single window, an alignment verification window and a quinary window, respectively, all utilized in the masking plate of FIG. 5.

DESCRIPTION OF THE PREFERRED EMBODIMENT

Figure 1:
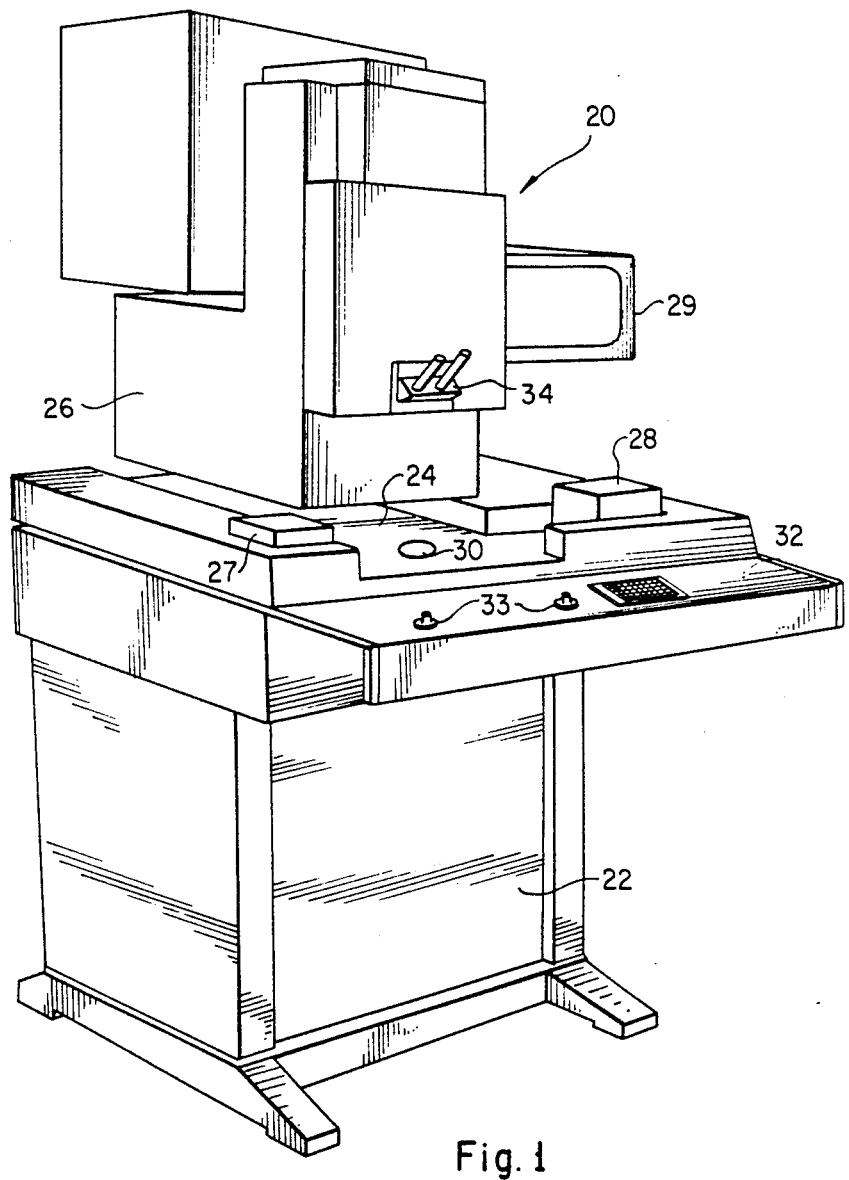
FIG. 1 is a perspective view of a step-and-repeat projection mask aligner incorporating an improved positioning system in accordance with the illustrated preferred embodiment of the present invention.

Referring to FIG. 1, a step-and-repeat projection mask aligner 20 is shown that incorporates a substrate positioning system in accordance with the preferred embodiment of the present invention. The mask aligner 20 comprises a workpiece stage 24, which is supported by a base 22 and which moves a substrate 30 to successive positions for exposure by a projection and exposure optics assembly 26. Substrates 30 are loaded onto and removed from the workpiece stage 24 by a workpiece handling system 27 and 28. An operator can automatically direct the positioning of each substrate 30 via a keyboard 32 and can manually control the positioning of a substrate via joysticks 33 while viewing the substrate through a microscope 34 or a television monitor 29.

Figure 2:
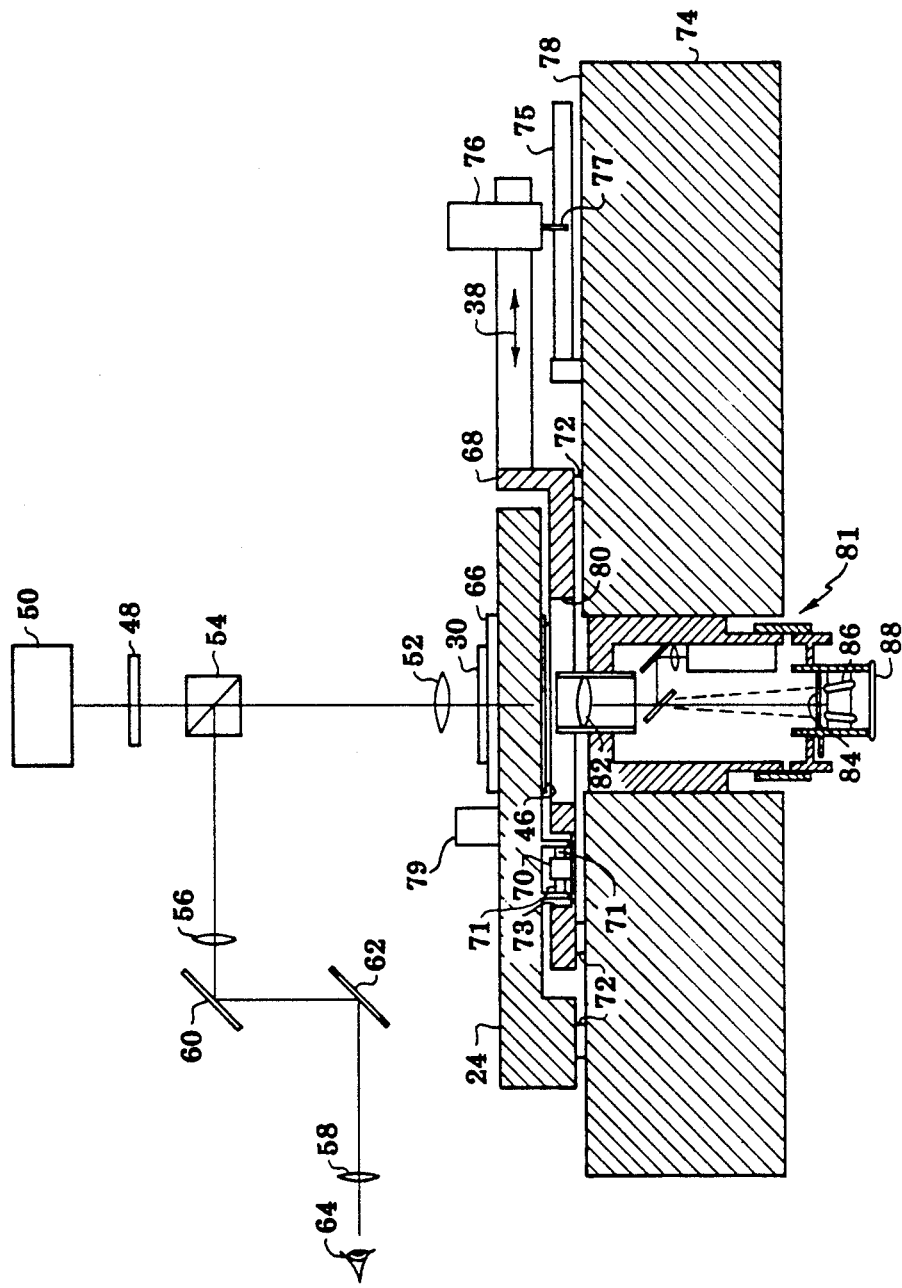
FIG. 2 is a combined schematic diagram and sectional view of a projection and exposure optics assembly employed in the mask aligner of FIG. 1 and of a portion of the positioning system of the mask aligner.

Referring now also to FIG. 2, a projection lens 52 of the projection and exposure optics assembly 26 projects an image of a mask or a reticle 48 onto a photoresist-coated upper surface of a substrate 30 loaded onto the workpiece stage 24. Either a 1:1 or a reduction projection lens 52 may be employed to project either a 1:1 or a reduced image of the mask or reticle 48 onto the upper surface of the substrate 30. When the substrate 30 is properly positioned with respect to the projected image of the mask or reticle 48, an exposure source 50 (typically an ultraviolet light source) of the projection and exposure optics assembly 26 exposes portions of the photoresist-coated upper surface of the substrate 30 in accordance with the pattern of the mask or reticle, A beam splitter 54 disposed between the mask or reticle 48 and the projection lens 52 enables an observer 64 to view on-axis images of the substrate 30 and the mask or reticle through the microscope 34, which comprises viewing lenses 56 and 58 and mirrors 60 and 62.

The substrate 30 is supported on the workpiece stage 24 by a chuck 66, which may be vertically adjusted along a Z axis and rotationally adjusted about the Z axis and orthogonal X and Y axes. X-Y positioning of the chuck 66 and, hence, the substrate 30 is accomplished by moving the workpiece stage 24 in the X-Y plane defined by a lapped upper surface 78 of a granite slab 74. The workpiece stage 24 is adapted for movement along the X axis by a saddle 68 supported on the lapped upper surface 78 of the granite slab 74 by three air bearings 72 and moved along the X axis (as indicated by double-headed arrow 38) by a servomotor 76 attached to the saddle and coupled to a drive rod 75 via a capstan drive 77. A guideway mounted on the upper surface 78 of the granite slab 74 parallel to the X axis constrains the saddle 68 to move parallel to the X axis. The stage 24 is also supported on the lapped upper surface 78 of the granite slab 74 by three air bearings 72 and is moved along the Y axis (orthogonal to the X axis) by a servomotor 79 attached to the workpiece stage and coupled to a drive rod in a manner similar to the servomotor 76. A guideway 70 is attached to the saddle 68 within a channel 73 of the saddle and is disposed parallel to the Y axis. Lateral air bearings 71 disposed between the guideway 70 and adjacent portions of the workpiece stage 24 permit movement of the workpiece stage along the Y axis, but constrain the workpiece stage to move with the saddle 68 along the X axis.

Positioning of the substrate 30 is accomplished, according to the preferred embodiment of the present invention, by providing improved X-Y position measurement apparatus 81 for determining or measuring the actual position of the workpiece stage 24 (herein referred to as the measured stage position), and by further providing improved feedback-controlled X-Y positioning apparatus (as hereinafter described) for moving the workpiece stage to a desired or predetermined position (herein referred to as the predetermined stage position). In response to a feedback signal that is proportional to the difference between the measured and predetermined stage positions, the feedback-controlled X-Y positioning apparatus moves the stage to the predetermined position. The improved X-Y position measurement apparatus will now be described with initial reference to FIGS. 2, 3 and 4.

Figure 3:
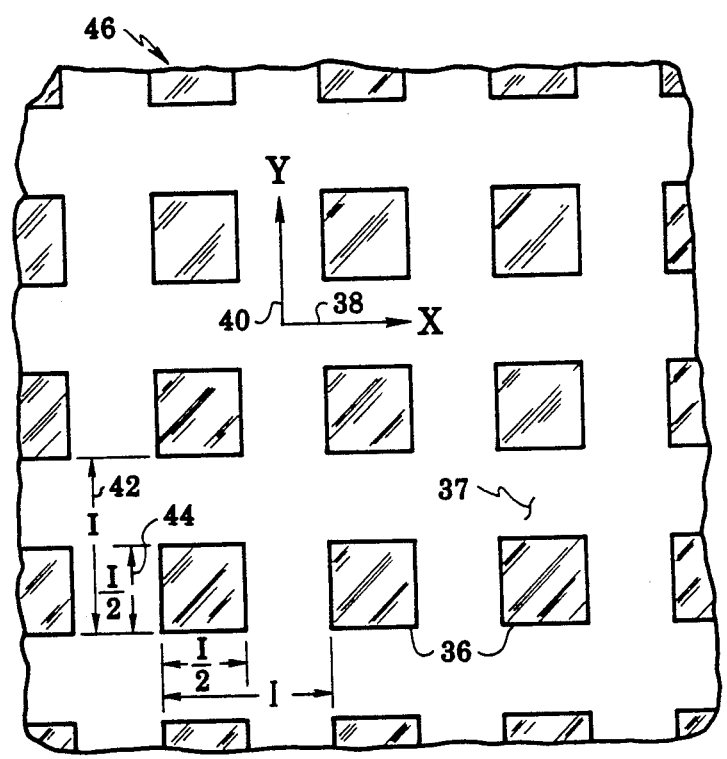
FIG. 3 is a plan view of a portion of an array of uniformly spaced X-Y coordinate indicia employed in the position measurement apparatus of the positioning system of FIG. 2.

An array 46 of uniformly spaced X-Y coordinate indicia 36 is fixedly attached to the underside of the workpiece stage 24 for movement therewith. As shown in FIG. 3, the indicia array 46 is composed of a grid of identical square indicia 36 arranged in orthogonal rows and columns along the X and Y axes, respectively. The side dimension 44 of each of the squares indicia 36 is equal to one half l, where l is the center-to-center indicium spacing 42 between adjacent indicia. The indicia 36 comprise reflective areas or surfaces within a relatively nonreflective background 37. In the preferred embodiment, the indicia array 46 is fabricated by the deposition of chromium indicia 36 onto a quartz plate 37.

Figure 4:
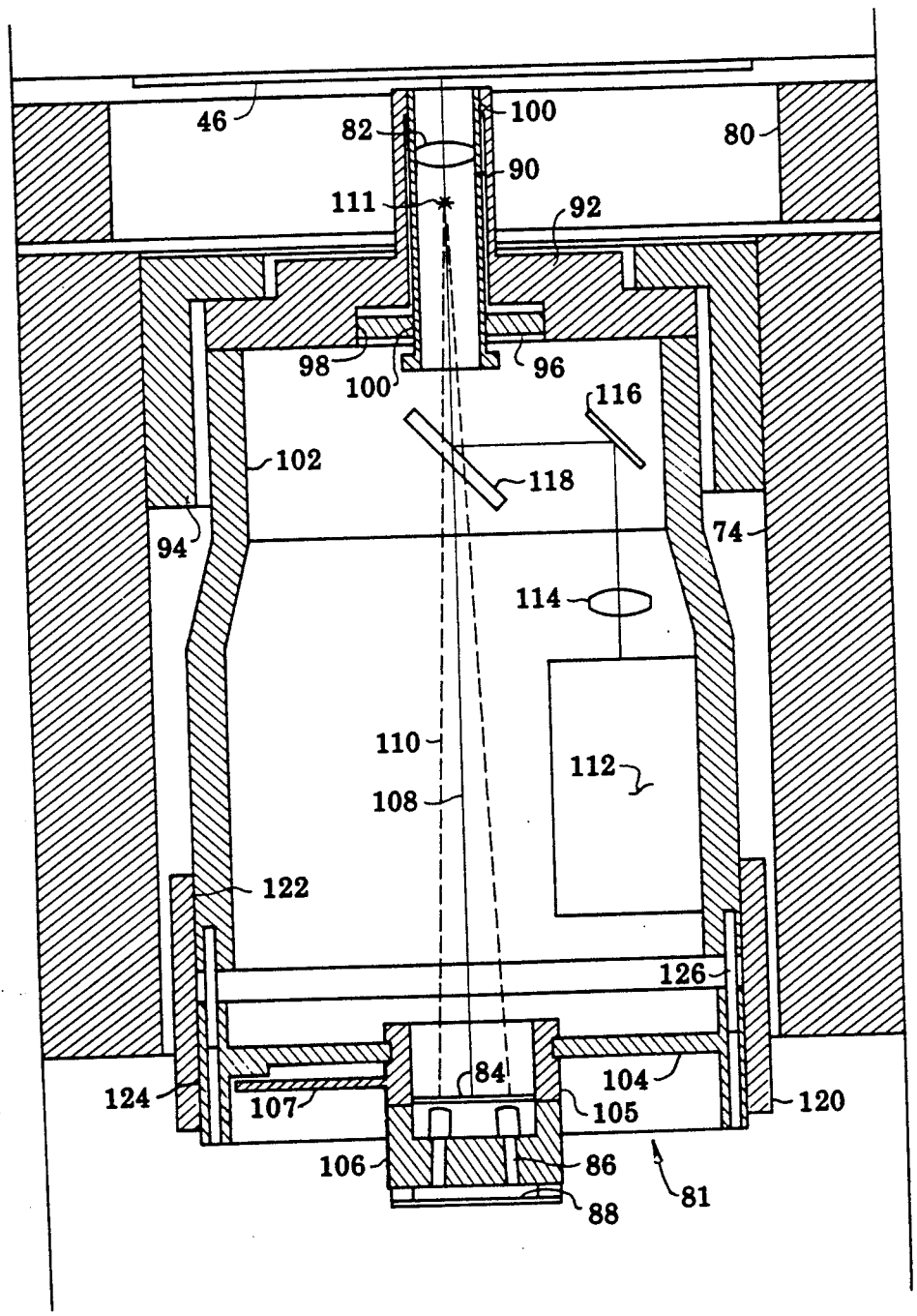
FIG. 4 is a sectional view of the position measurement apparatus of the positioning system of FIG. 2.

As shown in FIGS. 2 and 4, a slot 80 is formed in the saddle 68 to provide clearance for a focusing lens 82 and its mounting structure. Functionally, the focusing lens 82 projects a magnified and focused image of the indicia array 46 onto an opaque masking plate 84. Light passing through an array of transparent windows formed in the masking plate 84 is imaged onto a corresponding array 88 of photodiodes by a corresponding array of stick lenses 86. Signals generated by the photodiode array 88 in response to the position of the image of the indicia array 46 are determinative of the X-Y position of the workpiece stage 24.

As best shown in FIG. 4, the focusing lens 82 is mounted in a lens housing 90 which has fine screw threads disposed on its outer surface and which is screwed into a mount 92 at an upper end thereof having corresponding fine screw threads 100. Thus, vertical focus adjustment of the focusing lens 82 is accomplished by rotating the lens housing 90. When properly positioned, the lens housing 90 is locked in place by rotating a locking ring 96 also having fine screw threads 100 disposed on its inner surface in engagement with the threaded outer surface of lens housing 90 and having coarse screw threads 98 disposed on its outer surface in engagement with a correspondingly coarsely threaded portion of the mount 92. A collar 94 secured to the granite slab 74 provides an attachment for the mount 92, which includes both an upper housing portion 102 for supporting the lens housing 90 and a lower housing portion 104 for supporting a masking plate housing 105. Both the masking plate 84 and a stick lens housing 106 for supporting the stick lenses 86 are attached to the lower surface of the masking plate housing 105. The photodiode array 88 is in turn mounted on the lower surface of the stick lens housing 106. A lever 107 allows rotational adjustment of the masking plate housing 105 and, hence, of the masking plate 84, stick lenses 86 and photodiode array 88.

The stick lenses 86 and the photodiode array 88 are arranged so that the optical axes 110 of the stick lenses intersect the optical axis 108 of the focusing lens 82 at the exit pupil 111 of the focusing lens and so that the stick lenses 85 focus the exit pupil 111 onto the surface of the photodiode array 88. Thus, circular dots of light of uniform intensity proportional to the amount of light transmitted from the indicia array 46 through the windows of the masking plate 84 are projected by the stick lenses 86 onto the photodiode array 88. Illumination of the indicia array 46 is provided by a light source 112, a lens 114, a mirror 116 and a beam splitter 118, all mounted within the upper housing portion 102 of the mount 92.

An adjustment mechanism is provided for varying the separation distance from the focusing lens 82 to the masking plate 84 to change the magnification of the projected image of the indicia array 46. This mechanism comprises a turnbuckle ring 120, an upper portion of which is screwed onto a lower end of the upper housing portion 102 of the mount 92 and a lower portion of which is screwed onto the lower housing portion 104 of the mount. The upper portion of the turnbuckle ring 120 and the lower end of the upper housing portion 102 are provided with right-hand screw threads 122, while the lower portion of the turnbuckle ring and the lower housing portion 104 are provided with left-hand screw threads 124. Thus, as the turnbuckle ring 120 is rotated, the lower housing portion 104 and, hence, the masking plate 84 move axially with respect to the upper housing portion 102 and, hence, the focusing lens 82. Alignment pins 126 are provided to prevent the lower housing portion 104 from rotating relative to the upper housing portion 102 during adjustment of the separation distance between the focusing lens 82 and the masking plate 84.

Figure 5:
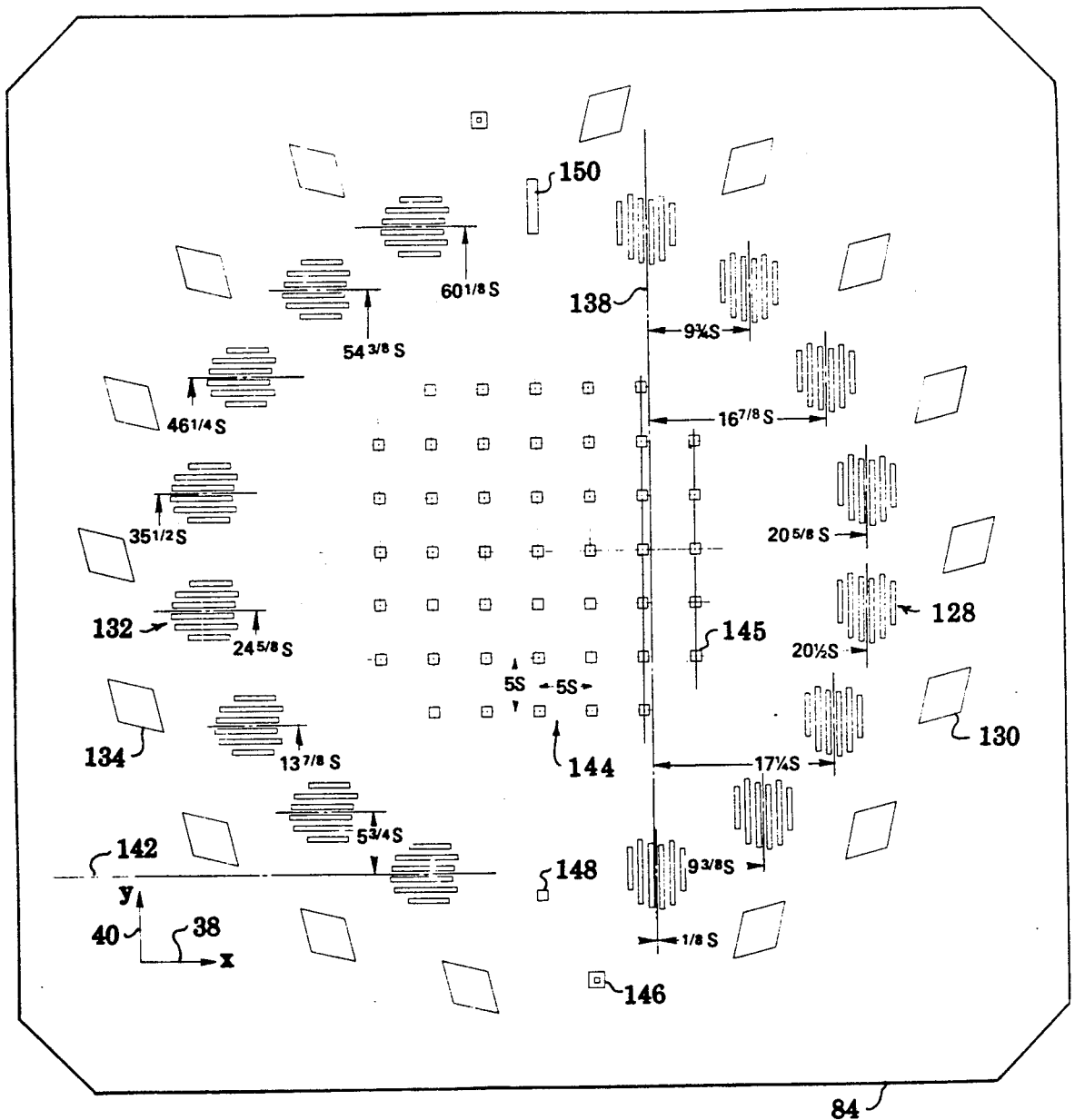
FIG. 5 is a plan view of a masking plate with transparent windows employed in the position measurement apparatus of FIGS. 2 and 4.
Figure 6:
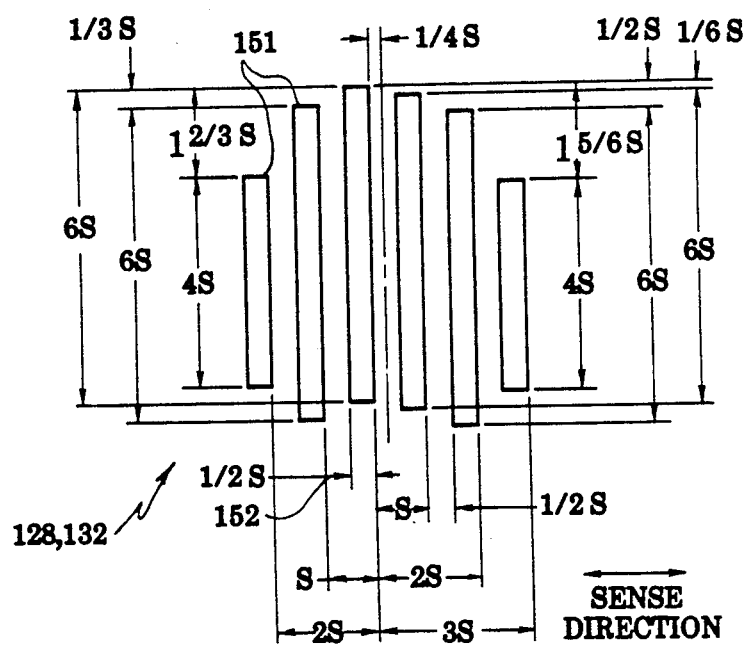
FIG. 6 is a dimensioned plan view of one of the slotted transparent windows employed in the masking plate of FIG. 5.

Referring now to FIG. 5, it may be seen that the opaque masking plate 84 has several types of transparent windows extending therethrough. Eight X slotted windows 128 with eight corresponding X reference windows 130 are provided for the determination of the X coordinate position of the workpiece stage 24 along the X axis. Similarly, eight Y slotted windows 132 with eight corresponding Y reference windows 134 are provided for the determination of the Y coordinate position of the workpiece stage 24 along the Y axis. As best shown in FIG. 6, each of the X and Y slotted windows 128 and 132 consists of six slots 151 having widths 152 equal to one-half of the projected indicia spacing, or $\frac{1}{2}$S. The projected indicia spacing, S, is equal to the indicium spacing, I in FIG. 3, times the magnification factor provided by the focusing lens 82 in imaging the indicia array 46 onto the masking plate 84. Thus, an indicium spacing of, for example, I=20 micrometers and a magnification factor of, for example, 14×, would provide a projected indicium spacing of S=280 micrometers.

The slots 151 of each X or Y slotted window 128 or 132 are arranged so that their longitudinal axes are perpendicular to the respective X or Y axis and so that they have a center-to-center spacing equal to S. As indicated by the dimensions given in FIG. 6, the slots 151 of each slotted window 128 or 132 are progressively offset along their longitudinal axes by a spatial phase shift of 1/6S minimize edge effects of the projected image of the indicia array 46. The four innermost slots 151 of each slotted window 128 or 132 have lengths equal to 6S, while the two outermost slots of the same slotted window have lengths equal to 4S. By making the outermost slots shorter in length than the other slots, a more rounded window outline is provided to aid in imaging the transmitted light onto the photodiode array 88.

Figure 7:
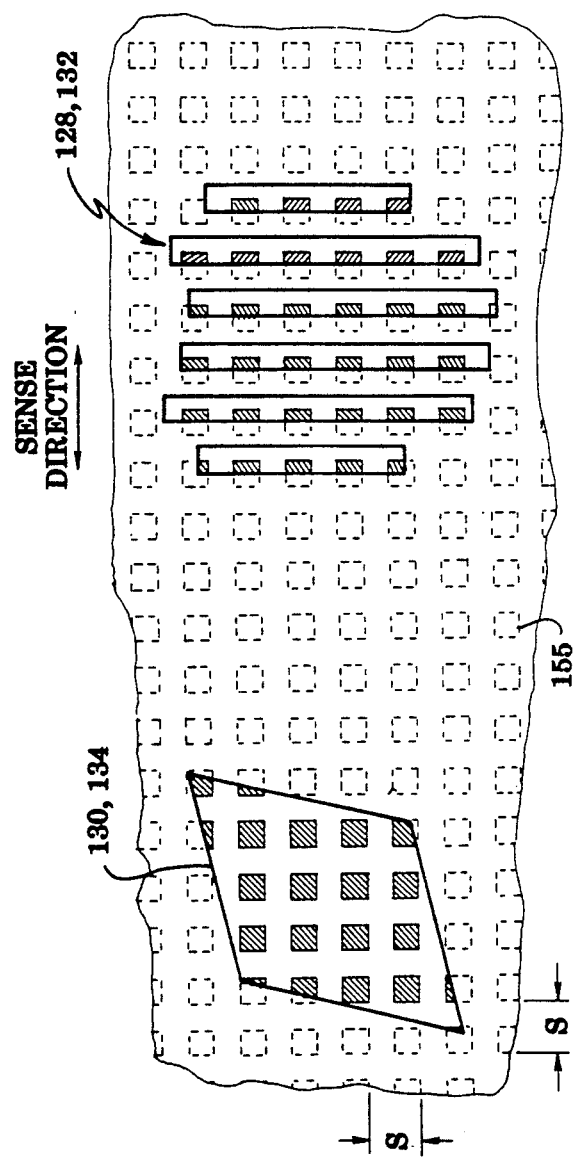
FIG. 7 is a plan view of a portion of the masking plate of FIG. 5 showing the relative position of a projected image of a portion of the indicia array of FIGS. 2 and 3.

In FIG. 7 there is shown an X or Y slotted window 128 or 132 with a projected image 155 of the indicia array 46. This projected image 155 is, as explained above, magnified and focused by the focusing lens 82. The X or Y slotted window 128 or 132 shown will transmit one-half of the reflected light from thirty-two indicia 36. If the image 155 were shifted by one-quarter of S to the right, the slotted window 128 or 132 would transmit all of the reflected light from all thirty-two indicia 36. However, if the image 155 were instead shifted by one-quarter of S to the left, the slotted window 128 or 132 would transmit no light because none of the indicia 36 would be imaged on the slotted window. Thus, the amount of light transmitted through the X or Y slotted window 128 or 132 is determinative of the X or Y coordinate position, respectively, of the projected image 155 and, hence, of the workpiece stage 24.

Figure 8:
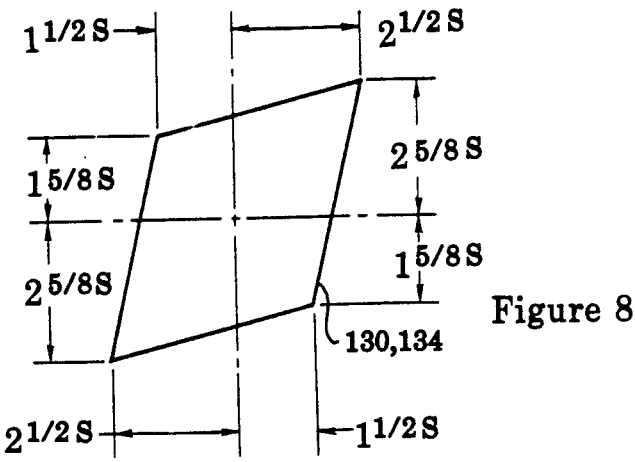
FIG. 8 is a dimensioned plan view of one of the reference windows employed in the masking plate of FIG. 5.

With reference now to FIGS. 7 and 8, it may be seen that each X or Y reference window 130 or 134 always transmits an amount of light equal to that reflected from sixteen indicia 36, whereas each X or Y slotted window 128 or 132 transmits an amount of reflected light which varies linearly from zero to that reflected from thirty-two indicia. Functionally, the spacing between each reference window 130 and its paired slotted window 128 is not critical because the reference window always images sixteen indicia regardless of orientation. Locating both windows in the same general area simplifies the layout of the photodiode array 88 and can reduce non-linearities due to uneven illumination or variable reflectivity of the indicia array 46. Each X or Y reference window 130 or 134 is a parallelogram in shape to minimize edge effects by transmitting images of both whole and partial indicia 36.

As indicated by the dimensions given in FIG. 5, the X slotted windows 128 are progressively offset along the X axis with respect to an X reference line 138 by a spatial phase shift of $\frac{1}{8}$S to facilitate interpolation of the X coordinate position of the projected image 155 and, hence, of the workpiece stage 24 without moving the window plate 84. Similarly, the Y slotted windows 132 are progressively offset along the Y axis with respect to a Y reference line 142 by the same spatial phase shift $\frac{1}{8}S$ to facilitate interpolation of the Y coordinate position of the projected image 155 and, hence, of the workpiece stage 24 without moving the window plate 84.

Figure 9:
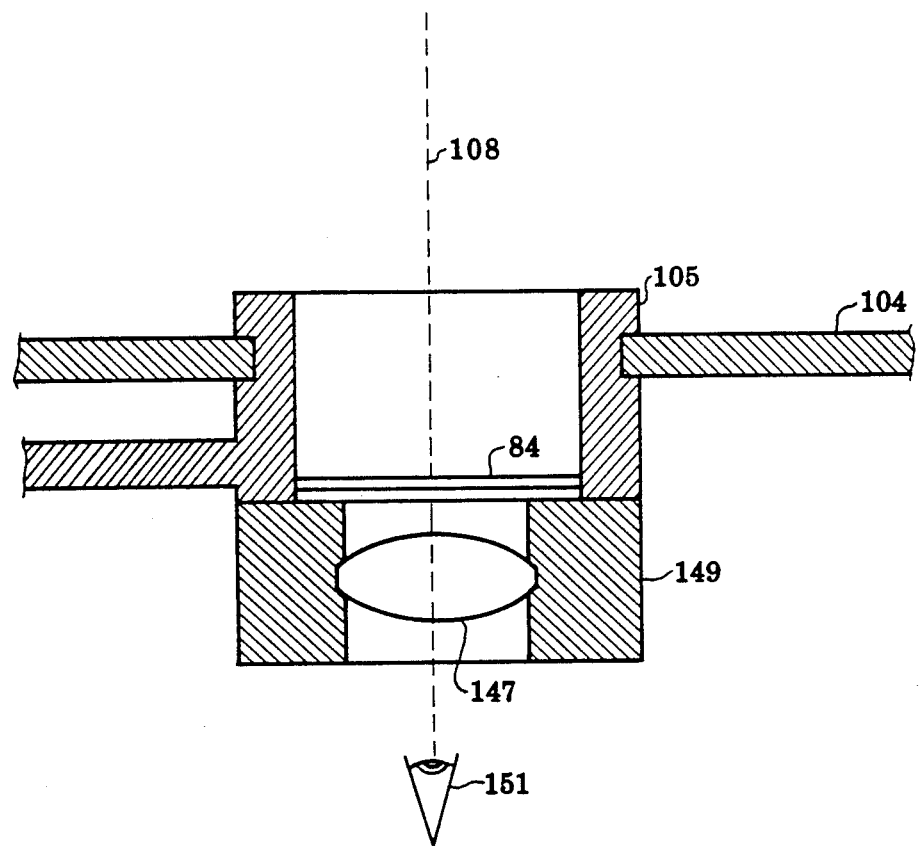
FIG. 9 is a sectional view of the lower portion of the position measurement apparatus of FIGS. 2 and 4 showing the useage of an ocular lens for alignment.

As shown in FIG. 5, the masking plate 84 also has an array 144 of identical square alignment windows 145. With reference now to both FIGS. 4 and 5, this alignment window array 144 may be employed in aligning the masking plate 84 with respect to the projected image 155 of the indicia array 46, in positioning the focusing lens 82 to focus the projected image onto the masking plate, and in adjusting the turnbuckle ring 120 to provide a magnification equal to that assumed during design of the masking plate. To align the masking plate 84 with respect to the projected image 155 of the indicia array 46, the stick lens housing 106 is removed from the position measurement apparatus 81 and replaced by an ocular lens housing 149 containing an ocular lens 147, as shown in FIG. 9. While looking through the ocular lens 147 at the alignment window array 144, an observer 151 alternately focuses the focusing lens 82, rotates the masking plate 84, and rotates the turnbuckle ring 120 until he observes a focused square of light at the same relative position in each window 145 of the alignment window array 144. Each window 145 of the alignment window array 144 may be dimensioned as shown, for example, in FIG. 10 and may be positioned in a square grid pattern on the masking plate 34 as shown, for example, in FIG. 5.

Two identical square-shaped alignment verification windows 146 are also included on the masking plate 84 to permit a final precision alignment of the masking plate with respect to the projected image 155 of the indicia array 46. Each of these alignment verification windows 146 includes an opaque square central region 154 and may be dimensioned as shown, for example, in FIG. 11. When a uniform amount of light is visible around the opaque central region 154 of each alignment verification window 146, the masking plate 84 is properly aligned with respect to the projected image 155 of the indicia array 46.

The masking plate 84 also has single square window 148 and a quinary rectangular window 150, which may be dimensioned as shown, for example, in FIGS. 10 and 12, respectively. These windows 148 and 150 permit the measurement of light reflected from a single reflective indicium 36 (see FIG. 3) and also light reflected from five consecutive reflective indicia 36 for comparison purposes. The masking plate 84 is preferably fabricated from a glass plate by deposition and subsequent selective removal of low reflectivity chromium.

Figure 13:
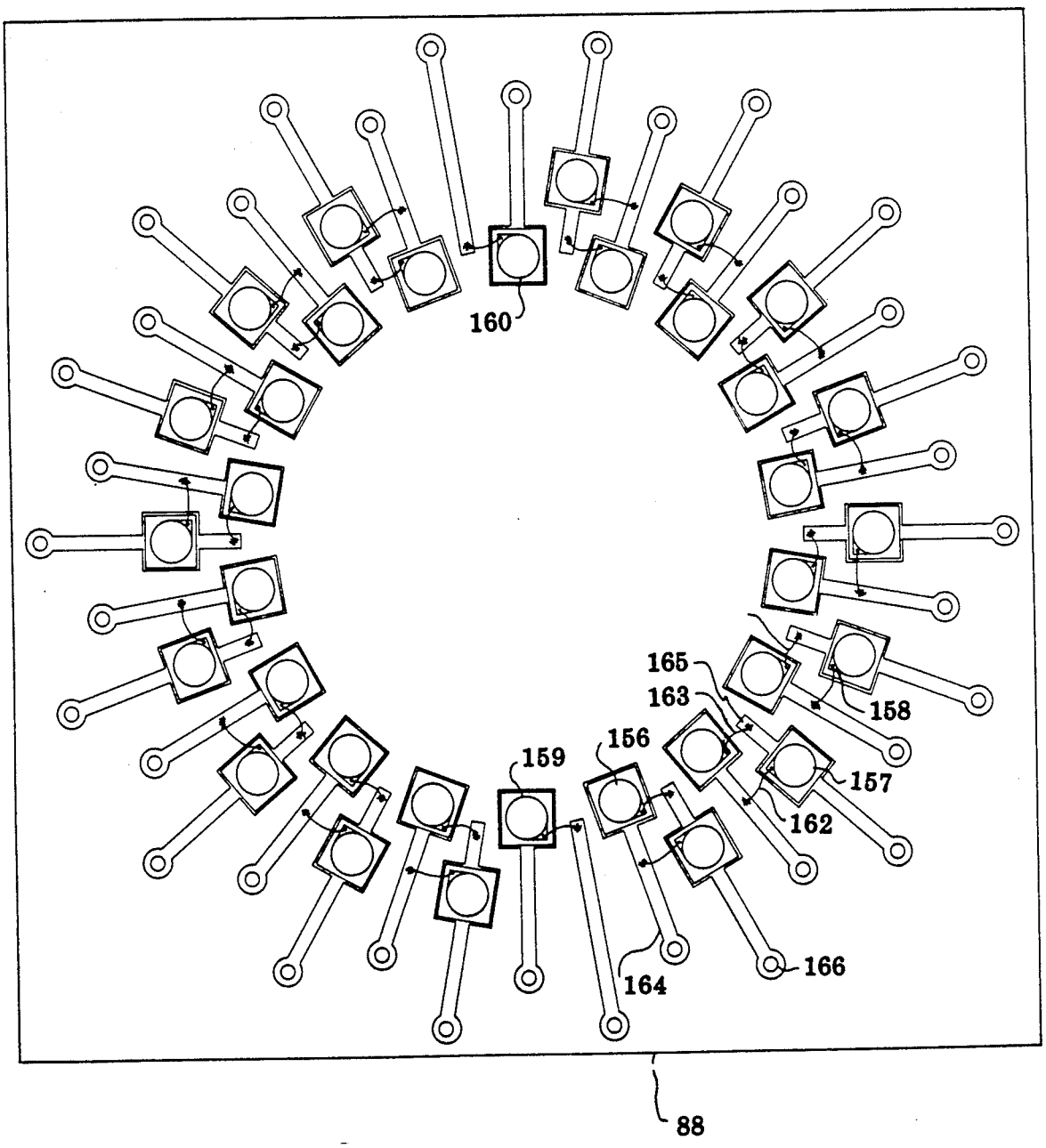
FIG. 13 is a plan view of a photodiode array employed in the position measurement apparatus of FIGS. 2 and 4.

Referring now to FIG. 13, it may be seen that the photodiode array 88 comprises thirty-four photodiodes 156, 157, 159 and 160 coaxially arranged in correspondence with the stick lenses 86 and the windows 128, 130, 132, 134, 148 and 150 of the masking plate 84. Two diametrically opposite photodiodes 159 and 160 are utilized to measure light passing through the single window 148 and the quinary window 150, respectively. The remaining thirty-two photodiodes 156 and 157, located throughout the photodiode array 88, are utilized to produce coordinate position signals by measuring the light passing through the slotted windows 128 and 132 and the reference windows 130 and 134, respectively. These remaining thirty-two photodiodes are combined into pairs 156 and 157 that correspond to the slotted and reference window pairs 128 and 130 or 132 and 134.

Each photodiode pair is wired in bucking relation (i.e., the cathode of a first photodiode of the pair is wired to the anode of the second photodiode of the same pair, and the anode of the first photodiode is wired to the cathode of the second photodiode). In accordance with the preferred embodiment of the present invention, the anode of each photodiode 156, which corresponds to a slotted window 128 or 132, is wired to the cathode of its paired photodiode 157, which corresponds to a reference window 130 or 134, via a wire 163 extending from a wire bonding corner 158 of the photodiode 156 to a wire bonding pad 165 of the photodiode 157. Conversely, the cathode of each photodiode 156 is wired to the anode of its paired photodiode 157 via a wire 162 extending from a circuit trace 164 of the photodiode 156 to a wire bonding corner 158 of the photodiode 157. Signals produced by the photodiodes 156, 157, 159 and 160 are conducted by circuit traces 164 to plated-through holes 166 for interconnection with the position measurement circuitry.

Figure 14:
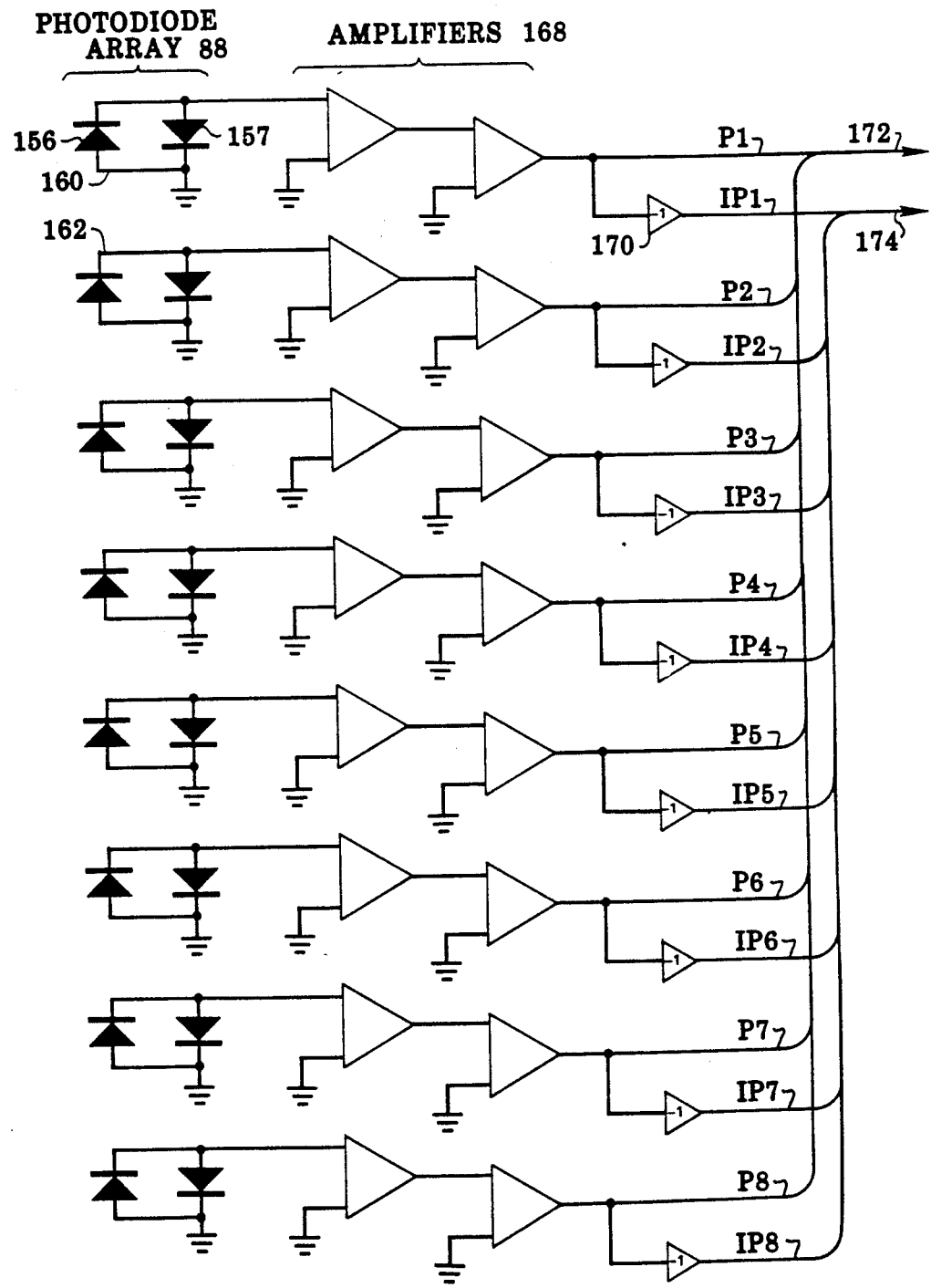
FIG. 14 is a schematic diagram of a photodiode signal amplification circuit employed with the position measurement apparatus of FIGS. 2 and 4.
Figure 15:
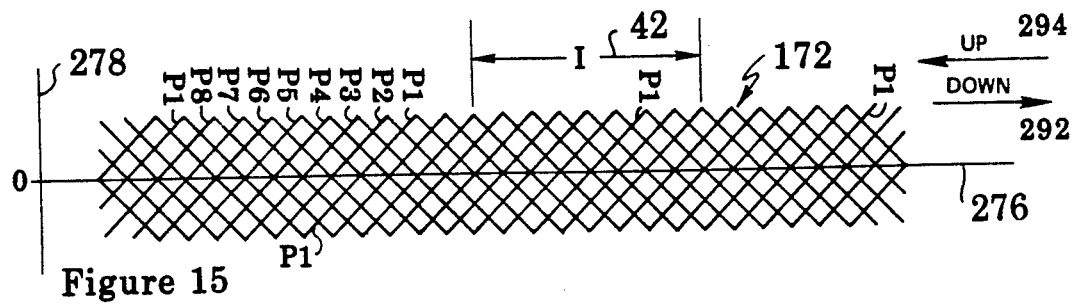
FIG. 15 is a plot of photodiode signal amplitude from the photodiode signal amplification circuit of FIG. 14 versus indica array position.

Measurement of the position of the indicia array 46 and, hence, the position of the workpiece stage 24 and the substrate 30, is accomplished by employing identical X and Y position measurement circuits, one of which is shown in FIG. 14. From inspection of FIG. 14, it may be seen that each of these position measurement circuits comprises eight pairs of photodiodes 156 and 157 with the photodiodes of each pair being connected from anode to cathode, with the cathode of the reference window photodiode 157 of each pair being grounded, and with the cathode of the slotted window photodiode 156 of each pair being connected to a corresponding amplifier 168. The resultant amplified photodiode signals obtained from the amplifiers 168 are denoted by P1 through P8, and inverted resultant amplified photodiode signals obtained from corresponding inverters 170 are denoted by IP1 through IP8. The phase relationship of the photodiode signals P1-P8 is shown in FIG. 15 wherein the amplitude 278 of those signals is plotted as a function of indicia array position 276. As can be seen from FIG. 15, the photodiode signals P1-P8 and, hence, the inverted photodiode signals IP1-IP8 are periodic triangular-shaped signals with a period equal to the indicia spacing, I, and with each signal being offset from the preceding one by a phase difference equal to $\frac{1}{8}$I.

Position measurement signals of the foregoing type are prone to nonlinearites caused by variations in amplifier gain due to production tolerances of the gainsetting components and by variation in photodiode output due to production tolerances of the photodiodes 156, 157, 159 and 160 or variations in the reflectivity or illumination of the indicia array 46. In accordance with the preferred embodiment of this invention, these nonlinearities are reduced in magnitude by a normalization technique that will now be described with reference to FIGS. 16, 17 and 18 and that greatly enhances the positioning accuracy of the mask aligner 20. Position measurement signals, such as the photodiode signals P1-P8 and the inverted photodiode signals IP1-IP8 ideally have a constant spatial phase difference or offset between adjacent signals during portions of the period when the adjacent signals are increasing or decreasing. In reality, however, this spatial phase difference or offset varies according to signal nonlinearities. However, by summing two adjacent signals and dividing by their difference, a normalized or gain-compensated position measurement signal is obtained.

Figure 16:
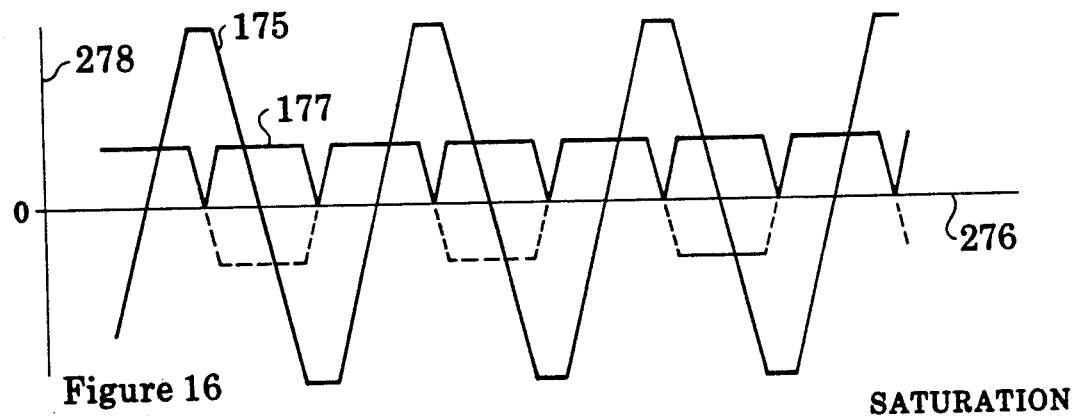
FIG. 16 is a plot of signal amplitude versus indicia array position of two summed signals utilized for automatic gain compensation.
Figure 17:
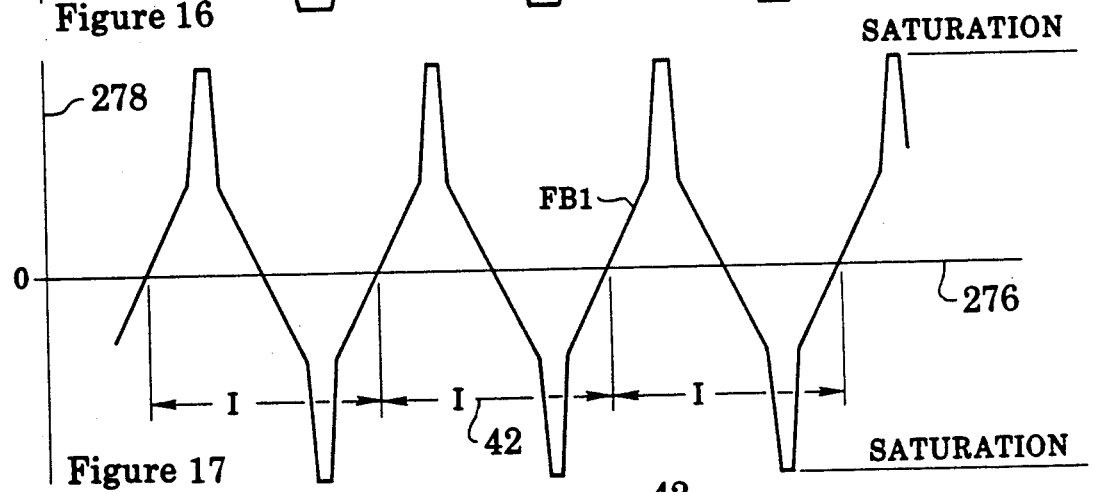
FIG. 17 is a plot of signal amplitude versus indicia array position for a normalized signal utilized for automatic gain compensation.

In conformance with the foregoing technique, two adjacent ones of the photodiode signals P1-P8 are summed together with two adjacent ones of the inverted photodiode signals IP1-IP8 (those inverted photodiode signals being derived from two adjacent photodiode signals that are spatially 180° out of phase with respect to the two first-mentioned photodiode signals) to form a resultant sum signal 175 as shown in FIG. 16. Concomitantly, the difference between the two first-mentioned photodiode signals and the difference between the two inverted photodiode signals are summed together and the absolute value taken to form a resultant difference signal 177 as further shown in FIG. 16. The quotient, FBI, of the resultant signals 175 and 177, which is plotted in FIG. 17, has both maximum and minimum values determined by amplifier saturation as the resultant signal 177 approaches zero. Advantages to using four of the photodiode signals P1-P8 and IP1-IP8 in performing the normalization technique include increased signal gradient as a function of indicia array position 276 and better linearity since the quotient of resultant position measurement signal, FB1, is an average of four of the photodiode signals.

Figure 19:
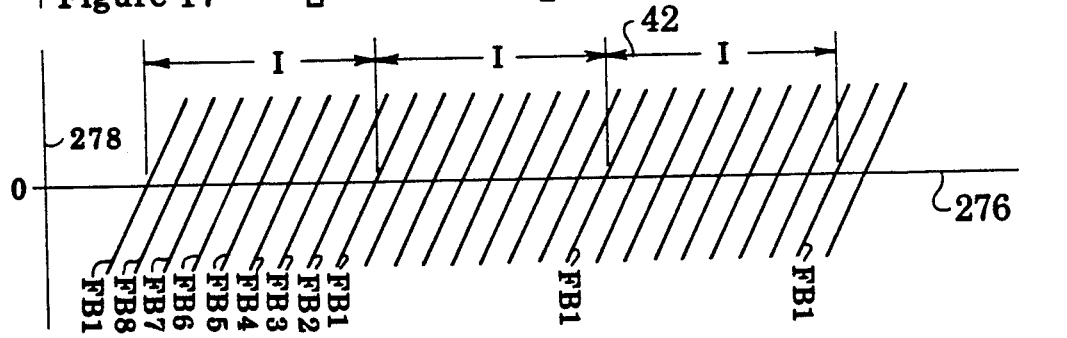
FIG. 19 is a plot of signal amplitude versus indicia array position for negative position feedback regions of normalized signals of the automatic gain compensation circuit of FIG. 18.
Figure 18:
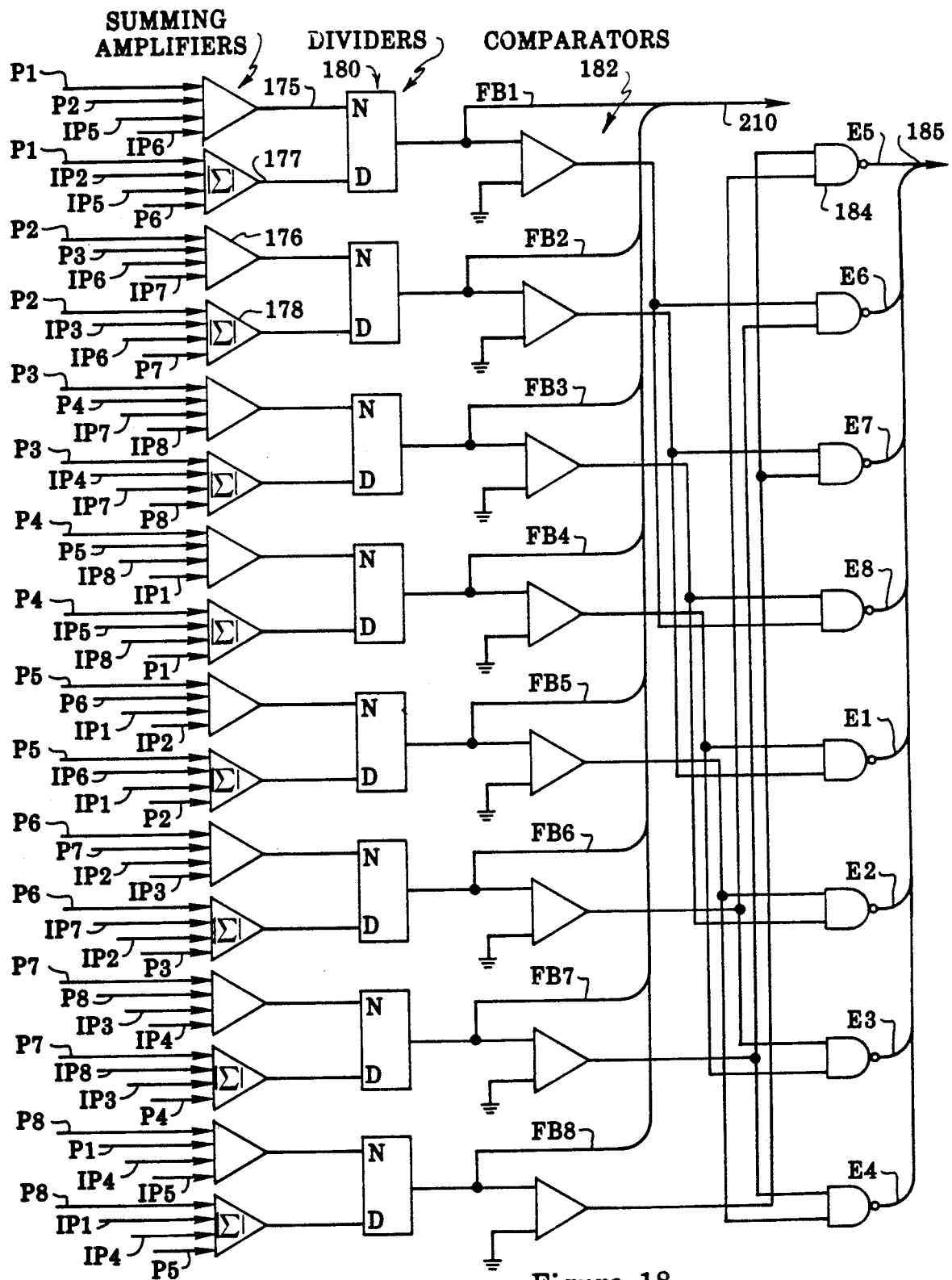
FIG. 18 is a schematic diagram of an automatic gain compensation circuit for generating the signals of FIGS. 16 and 17 and an enable circuit, both of which circuits are employed with the position measurement apparatus of FIGS. 2 and 4.

Referring now to FIG. 18 there is shown an automatic-gain compensation circuit including eight summing amplifiers 176 and eight corresponding absolute value summing amplifiers 178 for combining specific ones of the photodiode signals P1-P8 and specific ones of the inverted photodiode signals IP1-IP8, as indicated, to provide the resultant signals 175 and 177. This automatic-gain compensation circuit also includes dividers 180 for dividing corresponding resultant signals 175 and 177 to generate position measurement signals, FB1 through FB8 at output 210. The linear region of each of these position measurement signals FB1-FB8 that is suitable for utilization in negative feedback-controlled positioning is shown in FIG. 19.

Figure 20:
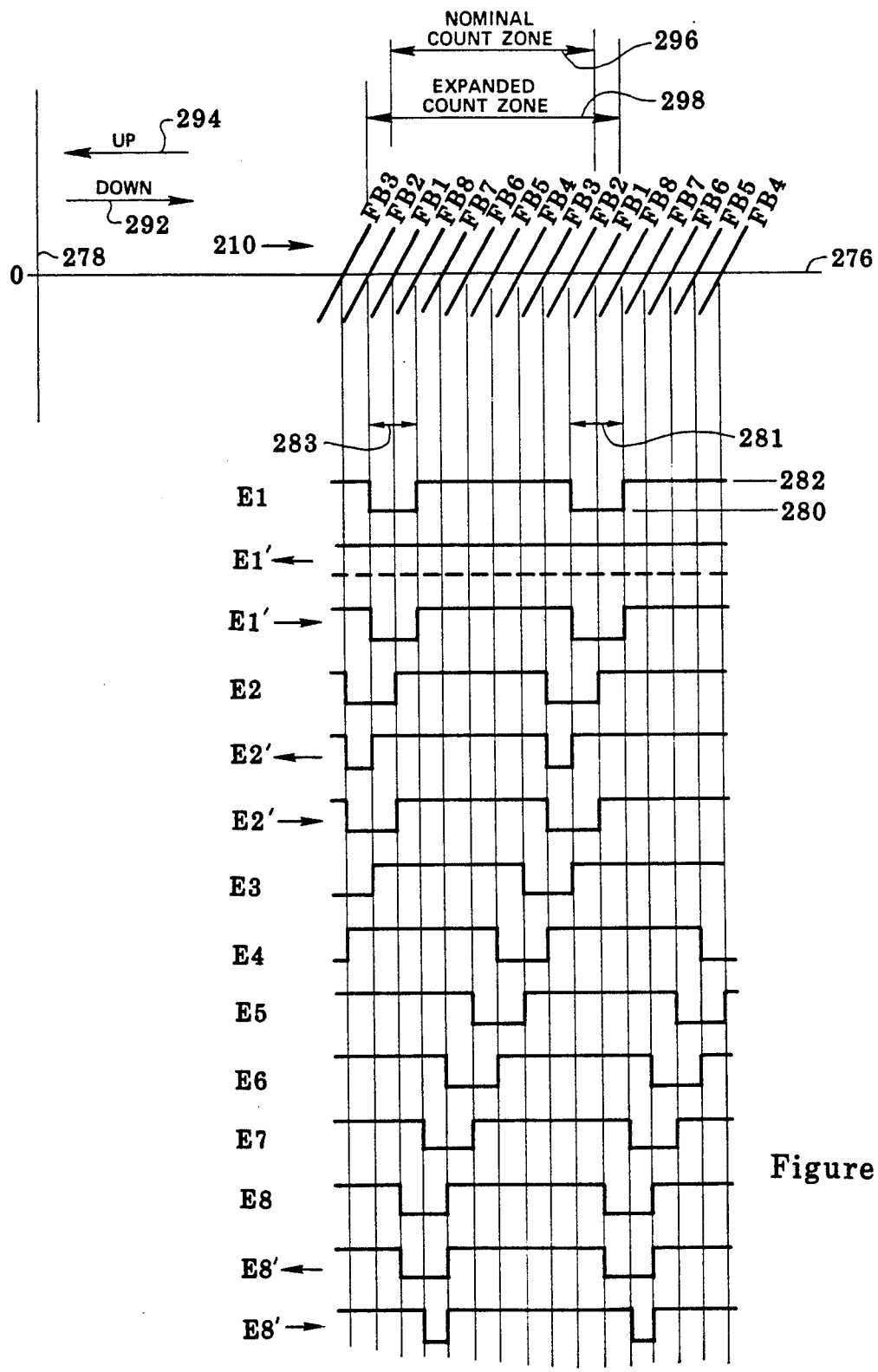
FIG. 20 is a plot of signal amplitude versus indicia array position for enable signals generated by the enable circuit of FIG. 18.

Referring again to FIG. 18, there is also shown an enable circuit employed to generate digital discrimination or enable signals E1 through E8, for confining the utilization of each of the position measurement signals FB1-FB8 to its proper region. This enable circuit includes a plurality of comparators 182, each of which is referenced to ground and each of which is coupled to the output of a corresponding one of the dividers 180 to receive the corresponding position measurement signal therefrom. The enable circuit also includes a plurality of NAND gates 184 coupled to the outputs of the comparators 182 for combining digital outputs therefrom to generate the enable signals E1-E8. These digital enable signals E1-E8 are plotted in FIG. 20 and vary from a disabled logic high level 282 to an enabled logic low level 280 according to the indicia array position 276. An enable zone 281 for position measurement signal FB1 spans the range of positions of workpiece stage 24 wherein FB1 is operable for stage position measurement. Also shown in FIG. 20 are enable signals E1', E2', and E8' which will later be described in detail.

To position the workpiece stage 24 at a predetermined position, the feedback-controlled X-Y positioning apparatus requires information about the predetermined position. This information includes a count of the number of indicia 36 spanning the distance from a reference point to the predetermined position (desired count), a selection of one of the eight position measurement signals FB1-FB8 to be used for feedback control during final positioning (phase select), and an amplitude that the selected position measurement signal will have when the workpiece stage 24 is at the predetermined position (desired amplitude). This information is compared to measured stage position information, which includes a measured count of indicia 36 between the reference point and the measured position, and the position measurement signals FB1-FB8. The feedback-controlled X-Y positioning apparatus first moves the workpiece stage 24 to a zone where the measured count and the desired count are equal, and then to a position where the amplitude of the selected position measurement signal is equal to the desired amplitude.

Figure 21:
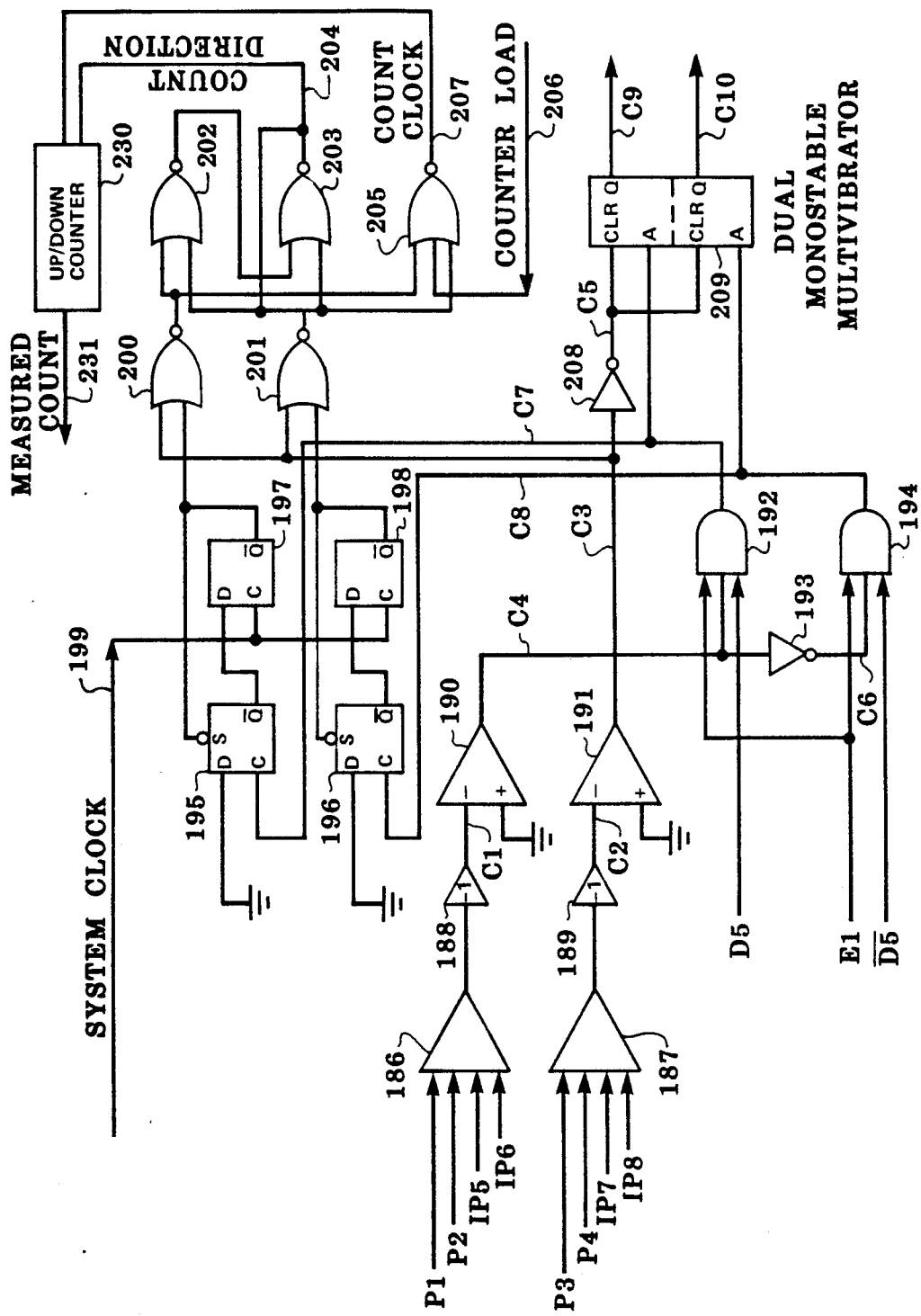
FIG. 21 is a schematic diagram of a counter circuit employed with the position measurement apparatus of FIGS. 2 and 4.
Figure 22:
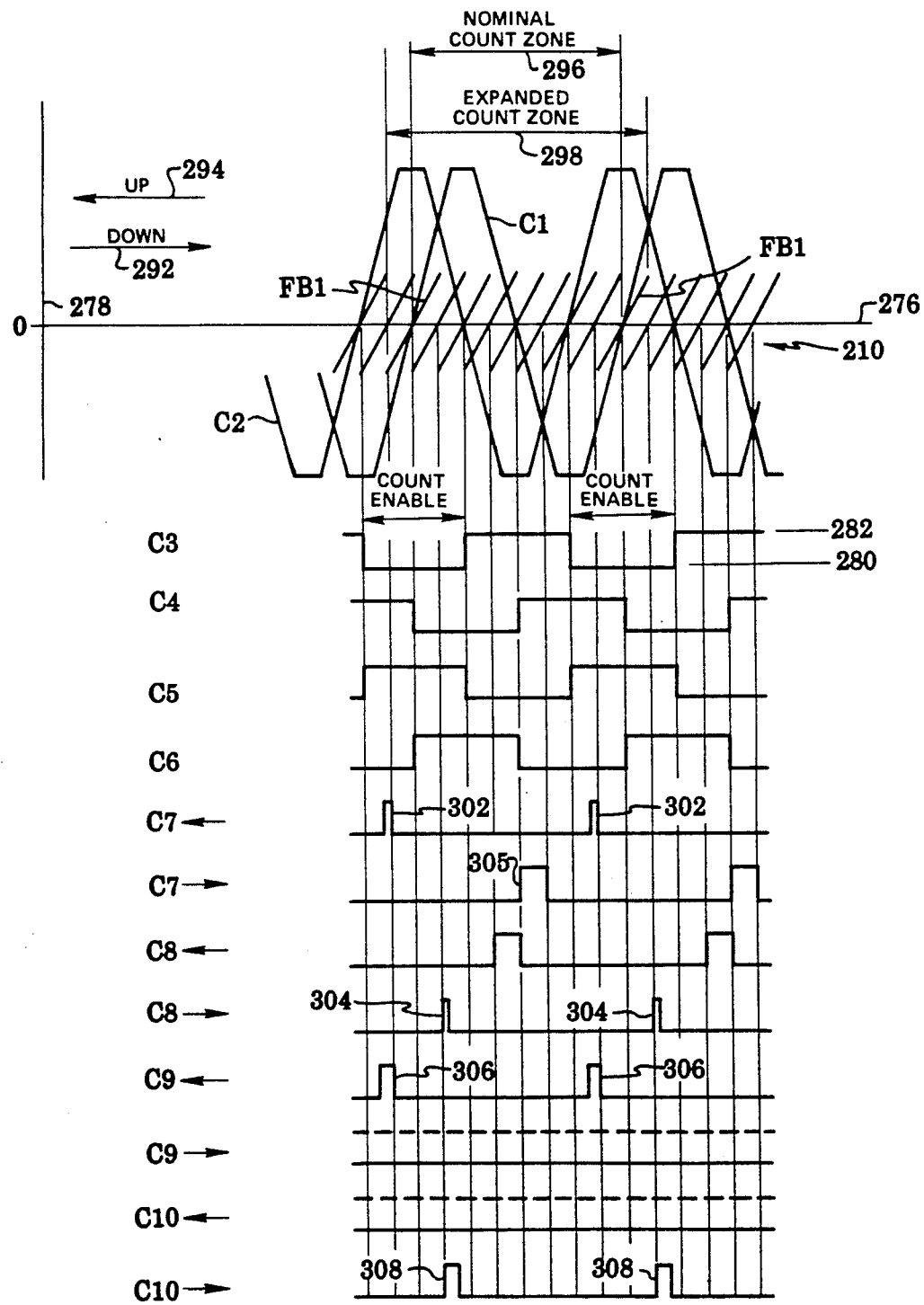
FIG. 22 is a plot of signal amplitude versus indicia array position for a group of signals from the counter circuit of FIG. 21.

Referring now to FIGS. 21 and 22, there is shown the circuitry and signals associated with counting the indicia 36. Two signals C1 and C2 are formed by using two inverting summing amplifiers 186 and 187 to sum four photodiode signals P1-P4 and four inverted photodiode signals IP5-IP8 and by inverting the outputs of these two inverting summing amplifiers with analog inverters 188 and 189, respectively. The amplitude 278 of signals C1 and C2 is plotted in FIG. 22 as a function of indicia array position 276. Digital representations of signals C1 and C2 are formed by comparators 190 and 191, respectively, having their positive inputs each referenced to ground, and their negative inputs coupled to the inverters 188 and 189, respectively. The resultant digital signals C4 and C3, respectively, are plotted in FIG. 22 and alternate between the logic low level 280 and the logic high level 282. A nominal count zone 296, bounded by the negative to positive transitions of signal C1 when the workpiece stage 24 moves in a down direction 292, is equal in length to the indicium spacing (I) 42.

To count the indicia 36 as the workpiece stage 24 moves, the counting circuit of FIG. 21 increments an up/down counter 230 for each nominal count zone 296 encountered. When the workpiece stage 24 moves to a position where the measured count of indicia 36 equals the desired count, then one of the eight position measurement signals (FB1-FB8) 210 is selected for final stage positioning within the nomimal count zone 296. Since the position measurement signals (FB1-FB8) 210 each overlap adjacent signals, position measurement signal FB1 actually spans the boundary between two nominal count zones. In order to avoid incrementing the counter 230 during final positioning when signal FB1 is the selected position measurement signal, the nominal count zone 296 is enlarged to an expanded count zone 298. The counter 230 is thus incremented only when the expanded count zone boundaries are crossed, To accomplish this end, the counting circuit of FIG. 21 forms an up count clock signal C7 and a down count clock signal C8.

Three signals E1, C4, and D5 are input to an AND gate 192 to form the up count clock signal C7. Signal C4 is inverted by a digital inverter 193 to form a signal C6, which is subsequently input to an AND gate 194 along with signals E1 and $\overline{D5}$ to form the down count clock signal C8. Since the waveforms of signals D5 and $\overline{D5}$ according to the direction of movement of the workpiece stage 24, the waveforms of both signals C7 and C8 also vary with stage direction as shown. Circuitry for generating signals $\overline{D5}$ 1 be described following this description of the counting circuitry.

When the workpiece stage 24 moves in the up direction 294, the up count clock signal C7 registers an up pulse 302 when the upper boundary of the expanded count zone 298 is crossed. In a similar fashion, when the workpiece stage 24 moves in the down direction 292, the down count clock signal C8 registers a down pulse 304 when the lower boundary of the expanded count zone 298 is crossed. These pulses 302 and 304 are used to actuate a series of D-type flip-flops and NOR gates to increment the counter 230. Signals C7 and C8 are coupled to the clock inputs C of first and second D-type flip-flops 195 and 196, respectively. The data inputs D of the first and second flip-flops 195 and 196 are grounded, and the inverse outputs $\bar{Q}$ are coupled to the data inputs D of third and fourth D-type flip-flops 197 and 198.

A system clock signal 199 is coupled to the clock inputs C of the third and fourth flip-flops 197 and 198. The inverse outputs $\bar{Q}$ of the third and fourth flip-flops 197 and 198 are coupled to the set inputs S of the first and second flip-flops 195 and 196, and are coupled to inputs of two NOR gates 200 and 201, respectively, Signal C3 is also applied to inputs of the two NOR gates 200 and 201 and provides a count enable function by allowing counts to register only at the boundaries of the expanded count zone 298. The outputs of the NOR gates 200 and 201 are coupled to a NOR latch formed from two interconnected NOR gates 202 and 203, which generate a count direction signal 204, and are also coupled to a fifth NOR gate 205. A counter load signal 206 is also coupled to the fifth NOR gate 205, which outputs a count clock signal 207. The count direction signal 204 registers at the logic high level 282 when the workpiece stage 24 moves in the up direction 294 and registers at the logic low level 280 when the stage moves in the down direction 292. The count clock signal 207 is normally at a logic high level and indicates a count by pulsing to a logic low level on the positive-going edge of the count signal C7 or C8.

The generation of the count direction signal 204 and the count clock signal 207 will now be described. When the workpiece stage 24 moves in the up direction 294, a count is desired when the upper boundary of the expanded count zone 298 is crossed. As that boundary is crossed, the up count clock signal C7 registers a logic high pulse 302, which clocks the first flip-flop 195, resulting in a logic high signal at its inverse output $\bar{Q}$. As noted above, the inverse output $\bar{Q}$ of the first flip-flop 195 is coupled to the data input D of the third flip-flop 197. When the system clock signal 199 clocks the third flip-flop 197, a logic low signal is produced at the inverse output $\bar{Q}$ of the third flip-flop. The duration of this logic low signal at the $\bar{Q}$ output of the third flip-flop 197 is equal to one period of the system clock signal 199, following which that output is reset to its normally high logic level. Thus, a positive-going transition of signal C7 results in a low pulse from the third flip-flop 197.

Examination of the waveform of signal C7 reveals that a pulse 305 is generated when the workpiece stage 24 moves in the down direction 292. To prevent this unwanted pulse 305 from incrementing the counter 230, signal C3 is gated with the $\bar{Q}$ outputs of the third and fourth flip-flops 197 and 198 at NOR gates 200 and 201, respectively. Signal C3 enables a count when it is at a low logic level. Therefore, a low pulse from the third flip-flop 197 combined with a low signal C3 results in a high pulse output from NOR gate 200, which causes NOR gates 202 and 203 to latch the count direction signal 204 to a logic high level. Simultaneously, the high pulse output from NOR gate 200 causes a low pulse to be output to the clock count line 207 by NOR gate 205.

Down counting is handled in a similar fashion with signal C8 applied to the second and fourth flip-flops 196 and 198. Thus, the counter 230 increments or decrements its count according to the count direction 204 at a point in time determined by the count clock 107. A counter, load signal 206 can be utilized to load a count into the counter during system initialization. The status of the counter 230 is relayed to the positioning apparatus via a measured count signal 231.

Signals C7 and C8 are also applied to the clock inputs A of a dual monostable multivibrator 209. Signal C3 is inverted by a digital inverter 208 to form signal C5, which is subsequently coupled to the clear inputs CLR of of the dual monostable multivibrator 209. A signal C9 having logic high pulses 306 corresponding to up counts is produced by the multivibrator 209 at one of its outputs Q. Similarly, a signal C10 having logic high pulses 308 corresponding to down counts is produced by the multivibrator 209 at the other of its outputs Q. Signals C9 and C10 are utilized to generate direction select signals which are described below.

Figure 23:
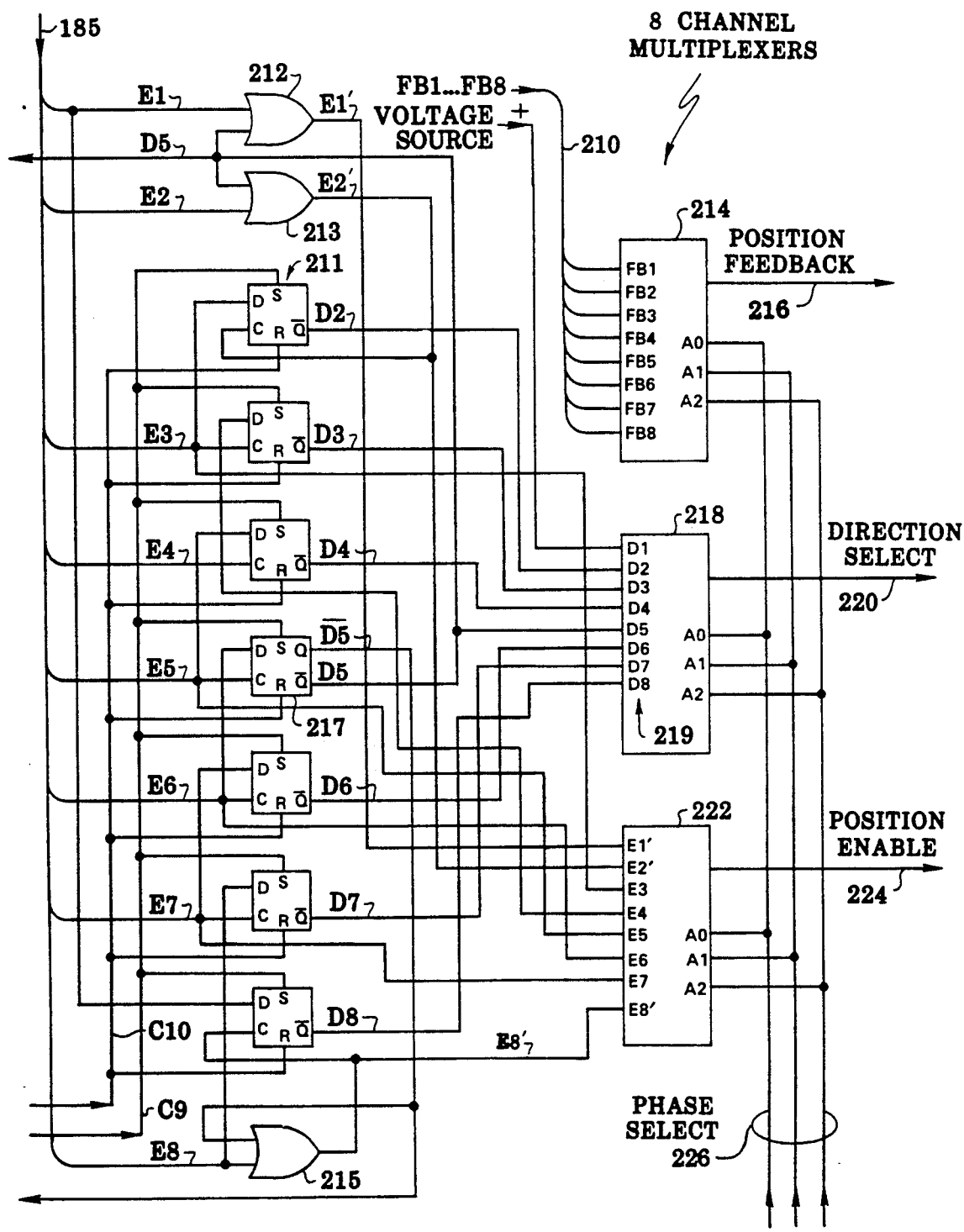
FIG. 23 is a schematic diagram of a direction selection and multiplexer circuit employed with the position measurement apparatus of FIGS. 2 and 4.

When the workpiece stage 24 is positioned using FB1 as the selected position measurement signal, the final stage position will be in the enable zone 281 shown in FIG. 20. A possibility exists that the workpiece stage 24 could be bumped causing it to move in the up direction 294 to a second enable zone 283 within the expanded count zone 298. This second enable zone 283 is normally utilized with the next higher nominal count zone. Similar possibilities exist when using FB2 or FB8 as the selected position measurement signal, although movement of the workpiece stage 24 would be in the down direction 292 in the latter case. To prevent such an occurance, the FB1 enable signal E1 is combined with signal D5 by an OR gate 212 to yield E1', as shown in FIG. 23. Similarly, the FB2 and FB8 enable signals E2 and E8 are combined with signals D5 and $\overline{D5}$, respectively, by OR gates 213 and 215 to yield signals E2' and E8'. Referring back to FIG. 20, it can be seen that signals E1', E2', and E8' prevent the aforementioned possibilities from occurring by allowing only one enable zone to exist for each position measurement signal in the expanded count zone 298. The enable signals E1', E2', E3, E4, E5, E6, E7 and E8' are coupled to a position enable multiplexer 222.

Referring now to FIG. 23, circuitry is shown for the generation of direction select signals (D1–D8) 219 for controlling the direction of movement of the workpiece stage 24 within the expanded count zone 298 when the magnitude of the positional error is less than I. Direction signals D3 through D7 are obtained from the inverted outputs $\bar{Q}$ of D-type flip-flops 211 each having signal E(n+1) applied to its data input D, signal E(n) applied to its clock input C, the signal C9 applied to its set input S and the signal C10 applied to its reset input R. Direction signal D2, is formed in a similar fashion but with the signal E2' applied as a clock input. Direction signal D8 is obtained at the inverted output $\bar{Q}$ of a D-type flip-flop 211 having the signal E1 applied as a data input, the signal E8' applied as a clock input, the signal C9 applied as a set input, and the signal C10 applied as a reset input. Direction signal D1 is always a logic high signal and is therefore connected to the positive side of a voltage source. A logic low value of a direction select signal signifies that the workpiece stage 24 must move in the up direction 294 to reduce the positional error, and a logic high value correspondingly signifies that the workpiece stage must move in the down direction 292, An inverse $\overline{D5}$ signal is provided at the noninverted output of flip-flop 217 for use with the counting and enable circuits.

Figure 24A:
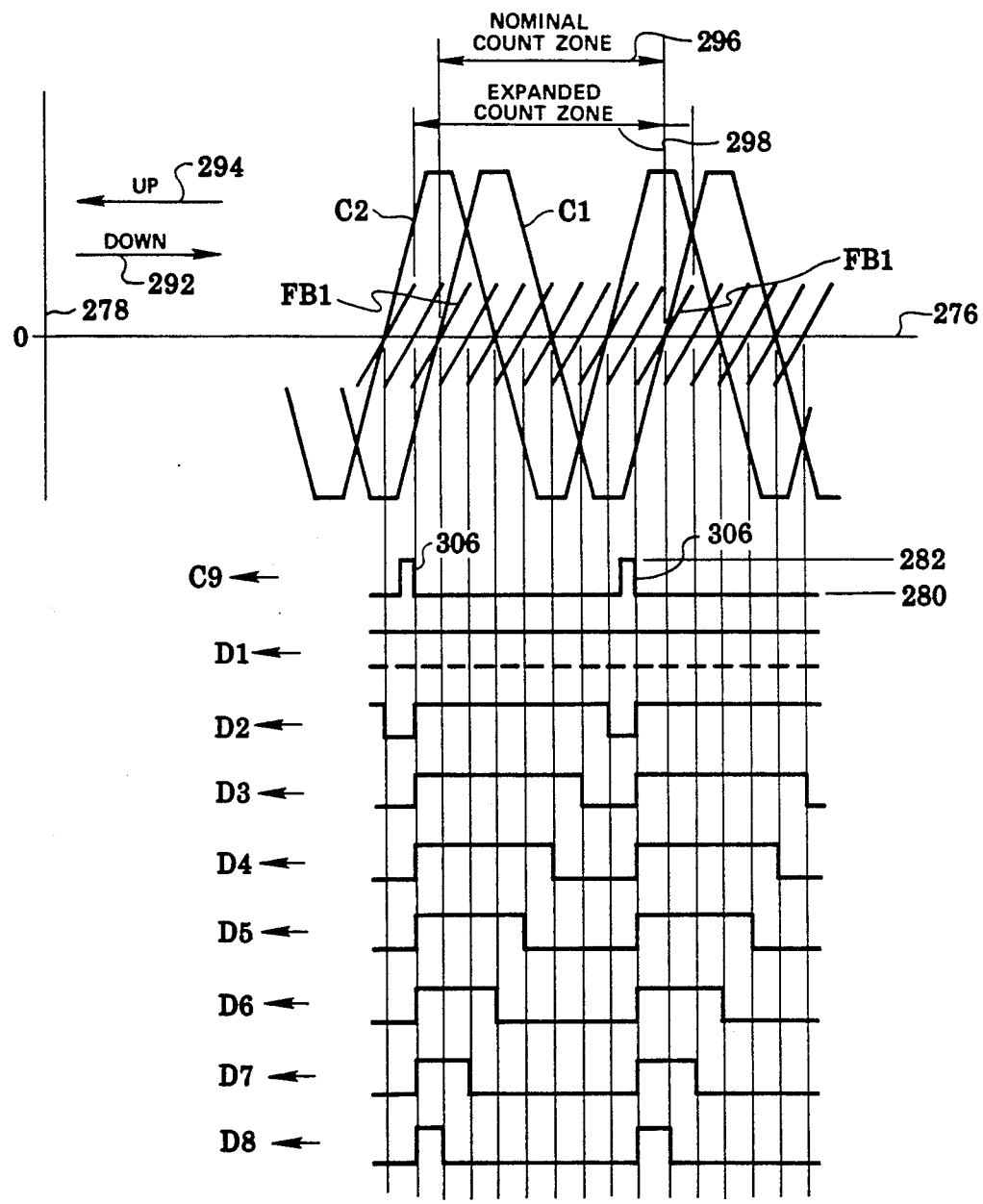
FIGS. 24a and 24b are plots of signal amplitude versus indicia array position for direction selection signals generated by the circuit of FIG. 23.
Figure 24B:
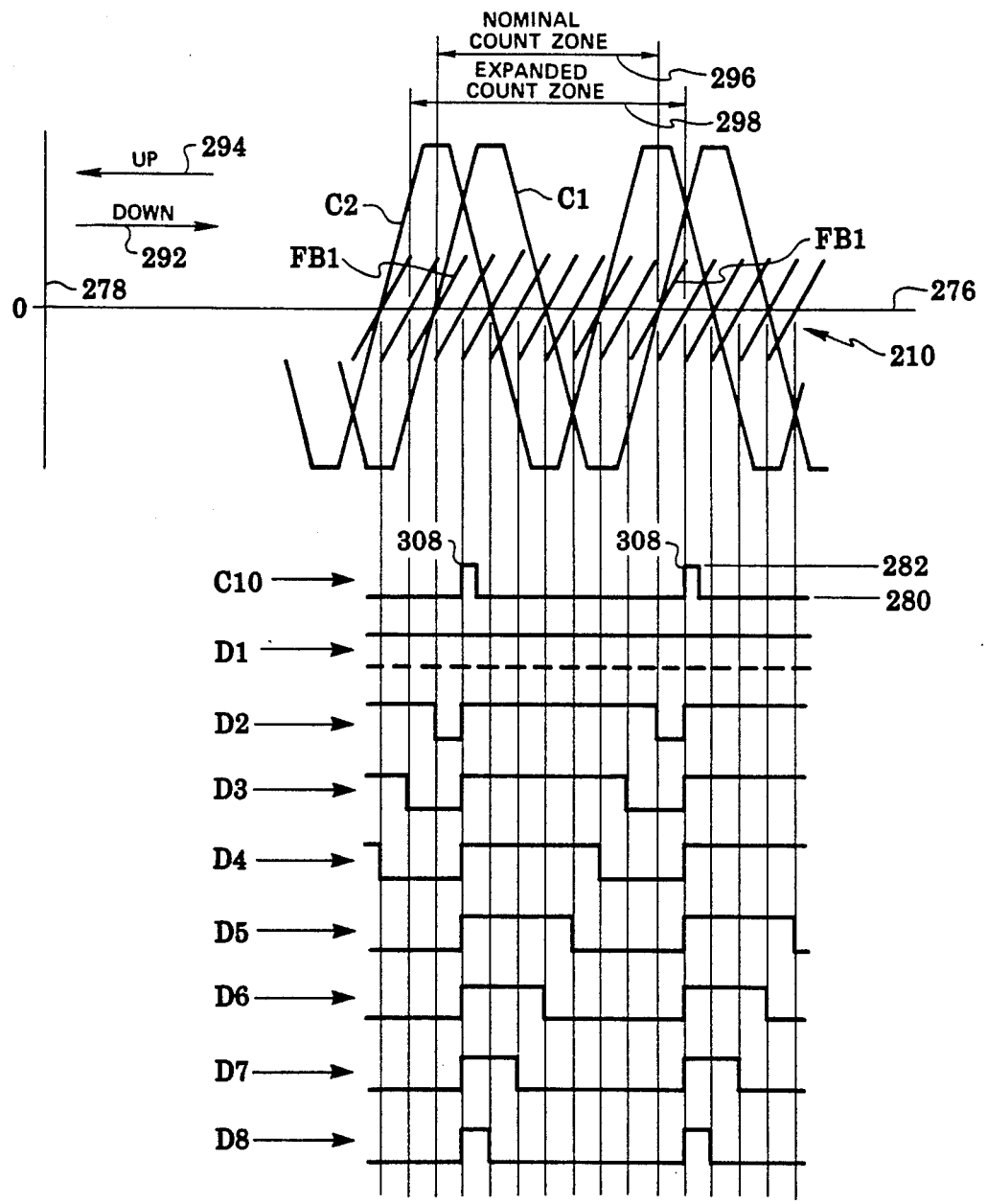

FIGS. 24a and 24B are plots of signal amplitude 278 versus indicia array position 276 for the direction select signals (D1–D8) 219. When the workpiece stage 24 moves in the up direction 294, the direction select signals (D1–D8) 219, except D1, exhibit a high-to-low signal transition at the upper boundary of the expanded count zone 298. Following this signal transition, those direction select signals remain low, which signals the positioning system to move the workpiece stage 24 in the up direction 294, until the proper enable zone is reached. If the proper enable zone is overshot, then the direction select signal will have a logic high value, which signals the positioning system to move the workpiece stage 24 in the down direction 292.

When the workpiece stage 24 moves in the down direction 292, the waveforms of the direction select signals (D1–D8) 219 are positionally offset relative to those occuring during movement in the up direction 294 because of the offset of the down versus the up counting pulses and the corresponding shift of the count zone. FIG. 24b shows that during movement of the workpiece stage 24 in the down direction 292, all of the direction select signals (D1–D8) 219, except D1, exhibit a low-to-high-signal transition at the lower boundary of the expanded count zone 298. Those direction select signals remain high until the workpiece stage 24 has moved into the appropriate enable zone. All of the direction select signals D1–D8 are coupled to a direction select multiplexer 218.

Figure 25:
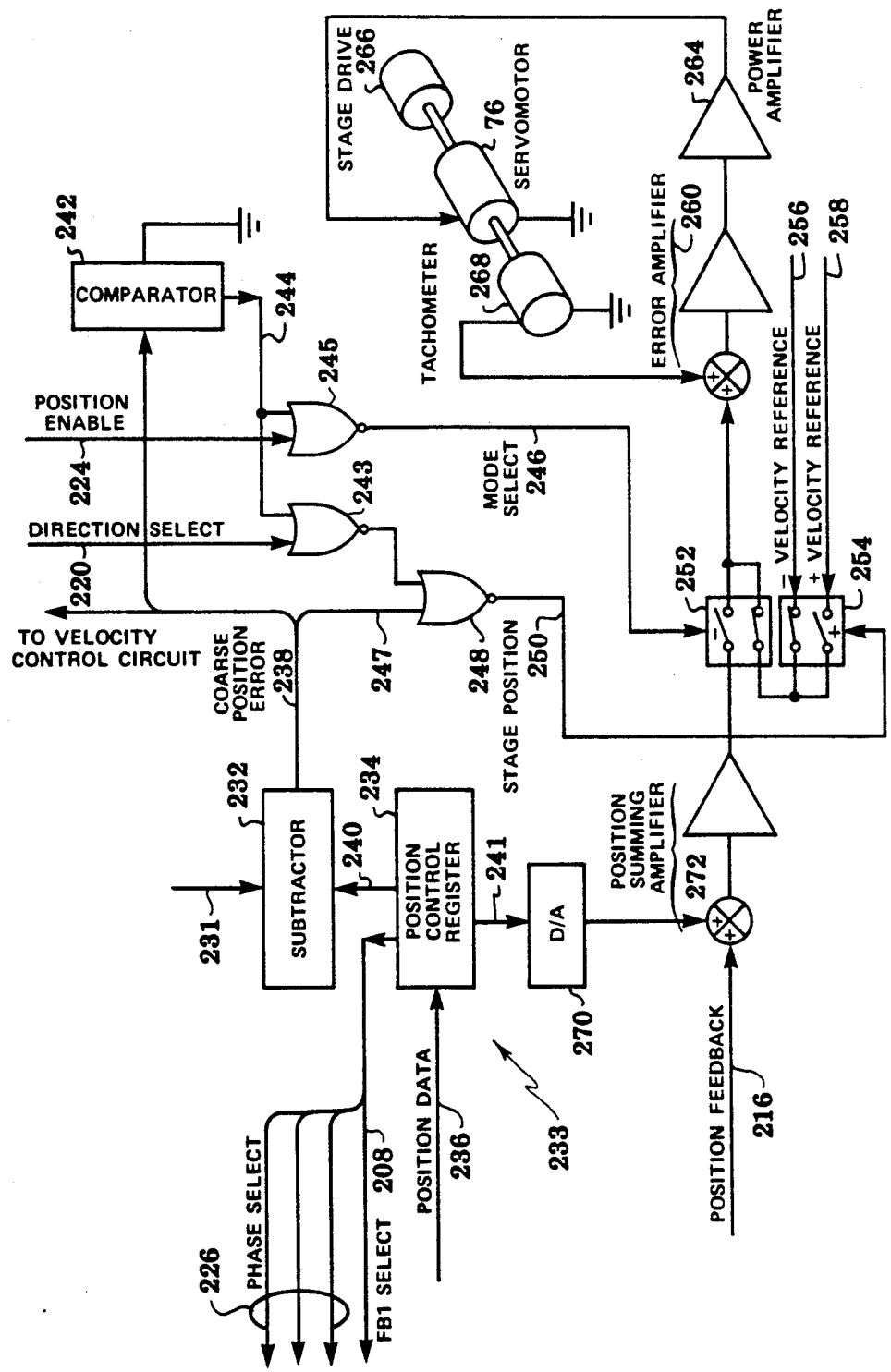
FIG. 25 is a schematic diagram of feedback-controlled positioning apparatus employed in the positioning system of FIG. 2.

Referring now to FIG. 25, data determinative of the desired or predetermined position of the workpiece stage 24 is input to a feedback-controlled positioning apparatus 233 by a position data signal 236 input to a position control register 234. This position data signal 236 comprises a desired system count 240, a one-of-eight phase select signal 226, and a desired position measurement signal amplitude 241. The phase select signal 226 is input to three, eight-channel multiplexers 214, 218, and 222 (see FIG. 23), which selectively apply three respective signals 216, 220 and 224 to the positioning apparatus 233. Position feedback multiplexer 214, which has the eight position measurement signals (FB1–FB8) 210 as inputs, applies a selected position feedback signal 216 to the positioning apparatus 233. Direction select multiplexer 218 applies one of the eight direction select signals (D1–D8) 219 to the positioning apparatus 233. Similarly, position enable multiplexer 222 applies one of the eight enable signals E1', E2', E3, E4, E5, E6, E7 and E8' to the positioning apparatus 233.

As shown in FIG. 25, the desired system count 240 is subtracted from the measured system count 231 by a digital subtractor 232 to yield a coarse position error 238 in multiples of I. The coarse position error 238 is compared to ground by a digital comparator 242 providing a coarse error bit signal 244 at its output. The most significant bit 247 of the coarse position error 238 is input to a NOR gate 248 which provides a stage direction signal 250 for controlling a stage direction switch 254. The most significant bit 247 is a logic low if the coarse position error is positive, which requires that the workpiece stage 24 move in the down direction 292 to reduce the positional error. Similarly, the most significant bit 247 is a logic high if the coarse position error is negative, which requires that the stage move in the up direction 294. When the coarse error bit signal 244 is a logic high, which signifies a coarse position error greater than I, the most significant bit 247 will control the stage direction signal 250 and, thus, the stage direction switch 254. The stage direction switch 254 is shown in FIG. 25 in a position representative of a logic high stage direction signal 250 with the workpiece stage 24 moving in the down (negative) direction 292. If the most significant bit 247 and the coarse error bit signal 244 are logic low, the workpiece stage 24 is positioned within the desired count zone 296 and the direction select signal 220 controls the stage direction switch 254. For example, a logic high direction select signal 220, which is indicative of a requirement to move the workpiece stage 24 in the down (negative) direction 292, is input to a NOR gate 243 that subsequently outputs a logic low signal to NOR gate 248. This logic low signal, when combined with a logic low most significant bit 247, switches the stage direction switch 254 to the position shown.

A mode select signal 246 from a NOR gate 245 controls the position of a mode select switch 252, which is shown in FIG. 25 at a position representative of a logic low mode select signal. The mode select signal 246 will be low unless the workpiece stage 24 is within the desired expanded count zone 298 and at the selected position measurement signal enable zone, as indicated by the position enable signal 224. When the mode select signal 246 is low, as shown, the servomotor 76 is controlled by either a positive or a negative velocity reference 258 or 256, as determined by the stage direction signal 250. Velocity reference signals 256 and 258 are generated by a velocity control circuit, which uses the coarse position error 238 as an input to determine an optimum stage velocity that is bounded by predetermined limits on stage velocity and acceleration. An error amplifier 260 compares the velocity reference signal 256 or 258 to a measured stage velocity signal from a tachometer 268, which is attached to the servomotor 76. A power amplifier 264 controls the servomotor 76 in response to the output of the error amplifier 260. Servomotor 76 moves the stage 24 via a stage drive 266 which may include a drive reduction mechanism.

When the mode select signal 246 is high, signifying that the workpiece stage 24 is positioned within the desired expanded count zone 298 and at the selected position measurement signal enable zone, the mode select switch 252 connects the servomotor amplifiers to a position summing amplifier 272. The desired position measurement signal 241 is converted to an analog signal by a digital-to-analog converter 270 and is compared to the position feedback signal 216 by the position summing amplifier 272, which in turn causes the servomotor 76 to move the stage 24 to the predetermined position. Any external forces which cause the workpiece stage 24 to move from the desired position will also cause the position measurement and feedback-controlled positioning apparatus to move the workpiece stage back to the desired position.

We claim:

1. Apparatus for positioning a workpiece at a predetermined coodinate location relative to a datum, said apparatus comprising:
   a stage, movable along coordinate axes, for holding the workpiece, said stage being positioned at a desired coodinate stage position when the workpiece is positioned at a predetermined location;
   measurment means for determining the coordinate position of the stage relative to the datum, said measurement means including an array of uniformly spaced coordinate indicia affixed to the stage for movement therewith, a sensor means for generating at least three spatially periodic sensor signals for each axis of movement of the state with the signals generated for each axis of movement having periods corresponding to the spacing of the coordinate indicia and being spatially out of phase by a uniform offset, and signal processing means for processing the sensor signals to produce a stage position signal determinative of the coordinate position of the stage relative to the datum; and positioning means for moving the stage to position the workpiece at the predetermined location, said positioning means including comparison means for comparing the stage position signal with input address information specifying the desired coordinate stage position to provide a positional error, and servo drive means for moving the stage in response to the positional error so as to minimize the positional error.

2. Apparatus as in claim 1 wherein the array of uniformly spaced coordinate indicia comprises a surface with spaced-apart reflective areas separated by relatively nonreflective areas.

3. Apparatus as in claim 2 wherein the sensor means comprises:
- a stationary masking plate having a generally opaque surface with a plurality of transparent windows allowing light to pass therethrough, said windows including at least three slotted windows for each axis of movement of the stage;
- means for illuminating the array of coordinate indicia;
- imaging means for projecting a focused image of the array of coordinate indicia onto the surface of the masking plate; and
- photosensitive means, disposed on the opposite side of the masking plate from the array of coordinate indicia, for sensing the amount of light transmitted through the slotted windows.

4. Apparatus as in claim 3 wherein the slotted windows for each axis of movement of the stage are offset relative to each other along the axis of movement by a distance equal to the projected indicia spacing divided by the number of slotted windows.

5. Apparatus as in claim 3 wherein the photosensitive means comprises:
- an array of photodiodes equal in number to the windows of the masking plate, said photodiodes being disposed for generating the sensor signals in proportion to the intensity of light incident thereon; and
- an array of stick lenses equal in number to the photodiodes, each of said stick lenses being mounted between the masking plate and a corresponding photodiode for imaging an exit pupil of the imaging means at the photodiode with an intensity of light proportional to the amount of light reflected from the array of coordinate indicia to a corresponding window of the masking plate.

6. Apparatus as in claim 3 wherein the array of coordinate indicia comprises orthogonal rows and columns of identical square reflective areas aligned with the coordinate axes and having a center-to-center spacing between adjacent square reflective areas equal to twice the length of a side of a square reflective area.

7. Apparatus as in claim 6 wherein each of the slotted windows comprises a plurality of parallel transparent slots of rectangular shape with a width equal to one half of the projected indicia spacing, with a length equal to an even integer multiple of the projected indicia spacing, and with the width being disposed in a direction parallel to the corresponding axis of movement of the stage.

8. Apparatus as in claim 6 wherein the masking plate further includes reference windows that are equal in number and in area to the slotted windows.

9. Apparatus as in claim 8 wherein each slotted window comprises a group of spaced parallel rectangular slots having a center-to-center spacing equal to an integer multiple of the projected indicia spacing with each slot of the group being offset laterally by a distance equal to the projected indicia spacing divided by the number of slots, having a width equal to one half of the projected indicia spacing and having a length equal to an integer multiple of the projected indicia spacing.

10. Apparatus as in claim 9 wherein each of the reference windows has the shape of a parallelogram permitting a constant amount of light to be transmitted therethrough independent of the position of the projected image of the array of coordinate indicia and has an area equal to the aggregate area of the group of rectangular slots forming a corresponding one of the slotted windows.

11. Apparatus as in claim 8 wherein:
- the slotted and reference windows and their corresponding photodiodes are grouped in pairs; and
- each pair of photodiodes is coupled so as to subtract the output of the photodiode for sensing light transmitted through the corresponding reference window from the output of the photodiode for sensing light transmitted through the corresponding slotted window.

12. Apparatus as in claim 6 including masking plate alignment means for positioning the masking plate in alignment with respect to the projected image of the array of coordinate indicia.

13. Apparatus as in claim 12 wherein said masking plate alignment means includes:
- a plurality of alignment windows in the masking plate spaced apart by integer multiples of the projected image of the array of coordinate indicia;
- ocular means, disposed on the opposite side of the masking plate from the array of coordinate indicia, for viewing the light transmitted through the alignment windows; and
- means for positioning the masking plate at an aligned position with respect to the projected image of the array of coordinate indicia as indicated by a uniform pattern of light transmitted through each of the alignment windows.

14. Apparatus as in any of the preceding claims 3, 4, 5, 6, 7, 8, 9, 10, 11, 12 or 13 wherein the imaging means comprises a convergent lens for focusing a magnified image of the array of coordinate indicia onto the masking plate.

15. Apparatus as in claim 1 wherein the signal processing means includes:
- means, responsive to the sensor signals, for counting the integer number of indicia spanning the distance from the datum to the actual position of the stage, said integer number of indicia being equal to an actual position count and, when multiplied by the indicia spacing, being equal to an actual position count measurement; and interpolating means, responsive to the sensor signals, for setting an actual fractional portion of the indicia spacing that, when added to the actual position count measurement, equals the distance from the datum to the desired coordinate stage position.

16. Apparatus as in claim 15 wherein the interpolating means includes:
   signal normalizing means for receiving the sensor signals, minimizing signal perturbations therein due to noise and nonlinearities and generating therefrom oscillatory and out-of-phase normalized signals; and
   signal enabling means for receiving the normalized signals and indicating ranges of the projected image of coordinate indicia wherein each normalized signal is a linear function of position.

17. Apparatus as in claim 16 wherein the signal normalizing means includes:
   summing means for combining adjacent sensor signals;
   subtraction means for subtracting adjacent sensor signals; and
   division means for dividing the combined signals by the subtracted signals to provide the normalized signals.

18. Apparatus as in claim 16 wherein the input address information specifying the desired coordinate stage position includes:
   a desired position count equaling the integer number of indicia spanning the distance from the datum to the desired coordinate stage position, said integer number of indicia, when multiplied by the indicia spacing, being equal to a desired position count measurement; and
   a desired fractional portion of the indicia spacing that, when added to the desired position count measurement, equals the distance from the datum to the desired coordinate stage position.

19. Apparatus as in claim 18 wherein the comparison means comprises:
   first comparison means for receiving the desired position count and the actual position count and for indicating a positional error in multiples of the indicia spacing; and
   second comparison means responsive to the desired fractional portion of the indicia spacing and to the actual fractional portion of the indicia spacing, for indicating a positional error as a fraction of the indicia spacing.

20. Apparatus as in claim 19 wherein the desired fractional portion of the indicia spacing is determined by a signal amplitude of one of the normalized signals when the stage is at the desired coordinate stage position.

21. Apparatus as in claim 19 wherein the comparison means further comprises switchable computing means, coupled to the first comparison means and the second comparison means, for computing the positional error from the first comparison means when the desired position count is not equal to the actual position count and for computing the positional error from the second comparison means when the desired position count equals the actual position count.

22. Apparatus as in claim 1 wherein the servo drive means comprises:
   a separate servomotor for moving the stage along each axis; and
   servomotor control means, responsive to the positional error, for directing each servomotor as required to position the stage at the desired stage position.

23. Apparatus as in claim 22 wherein the servomotor control means comprises:
   a separate power amplifier for supplying each servomotor with drive signals;
   a separate tachometer, coupled to each servomotor, for monitoring the servomotor velocity; and
   a separate velocity control circuit, responsive to the tachometer, for limiting the velocity and acceleration of each servomotor to predetermined limits.

24. A method for positioning a workpiece at a preselected coordinate location, said method comprising the steps of:
   supporting the workpiece on a stage moveable along coordinate axes and having an array of coordinate indicia attached thereto for movement therewith;
   projecting an image of the array of coordinate indicia onto a sensor;
   sensing the projected image of the array of coordinate indicia to generate at least three spatially periodic position signals for each axis of movement of the stage, the position signals generated for each axis of movement being proportional to the relative position of the projected image of the array of coordinate indicia and being uniformly spatially offset with respect to each other, the position signals generated for the coordinate axes of movement being determinative of an actual workpiece position;
   comparing the actual workpiece position to the preselected coordinate location and generating an error signal in proportion to the difference between the actual workpiece position and the preselected coordinate location; and
   moving the stage in response to the error signal to a position corresponding to the preselected coordinate location.

25. A method of positioning a workpiece as in claim 24 wherein the projecting step comprises:
   focusing an image of the array of coordinate indicia onto a masking plate having a generally opaque surface with transpatent areas having widths equal to one half of the projected indicia spacing; and
   imaging the light transmitted through the masking plate onto a sensor.

26. A method of positioning a workpiece as in claim 24 wherein the error signal includes information relating to the magnitude and direction of movement of the stage required to position the workpiece at the preselected coordinate location.

27. A method of normalizing a feedback signal comprising two or more oscillatory signals out of phase by a uniform shift, said method comprising the steps of:
   summing two adjacent ones of those oscillatory signals, one leading and one trailing, to produce a numerator;
   substracting the two adjacent oscillatory signals to produce a denominator; and
   dividing the numerator by the denominator to yield a dimensionless normalized linear signal of reduced error content; and
   selecting a portion of the dimensionless normalized signal for utilization as a feedback signal.

28. A method as in claim 27 including the additional step of converting the denominator to a positive value by finding the absolute value of the difference between the two adjacent signals.

29. A method as in claim 27 wherein the last mentioned step comprises selecting the portion of the dimensionless normalized signal, defined by the period between a minimum of the trailing signal and a maximum of the leading signal, for utilization as a feedback signal.

30. A method as in claim 27 wherein the last mentioned step comprises selecting the portion of the dimensionless normalized signal, defined by the period between a maximum of the trailing signal and a minimum of the leading signal, for utilization as a feedback signal.

* * * * *